US012780569B1

(12) United States Patent
Baker et al.

(10) Patent No.: US 12,780,569 B1
(45) Date of Patent: Nov. 3, 2026

(54) STABLE ATTRACTIVE MAGNETIC MOBILITY AND LOCKING SYSTEM

(71) Applicant: US Positronix Inc., Oberlin, OH (US)

(72) Inventors: John M. Baker, Hayward, CA (US); Remigio Perales, Oberlin, OH (US); Simon A Perales, Oberlin, OH (US)

(73) Assignees: US Positronix Inc., Oberlin, OH (US); SRI International, Menlo Park, CA (US)

( * ) Notice: Subject to any disclaimer, the term of this patent is extended or adjusted under 35 U.S.C. 154(b) by 0 days.

(21) Appl. No.: 19/200,641

(22) Filed: May 6, 2025

Related U.S. Application Data

(63) Continuation-in-part of application No. 18/896,855, filed on Sep. 25, 2024.

(51) Int. Cl.
*B65G 54/02* (2006.01)
*H01F 7/02* (2006.01)
*H01F 7/20* (2006.01)

(52) U.S. Cl.
CPC ........... *B65G 54/02* (2013.01); *H01F 7/0252* (2013.01); *H01F 7/206* (2013.01); *H01F 2007/208* (2013.01)

(58) Field of Classification Search
None
See application file for complete search history.

(56) References Cited

U.S. PATENT DOCUMENTS

| | | | | |
|---|---|---|---|---|
| 4,486,729 A * | 12/1984 | Lee | F16C 32/0425 446/133 |
| 11,948,822 B2 * | 4/2024 | Li | H10P 72/0464 |
| 2018/0334338 A1 * | 11/2018 | Yamamoto | B65G 54/02 |
| 2019/0097515 A1 * | 3/2019 | Ota | B65G 54/02 |
| 2020/0052568 A1 * | 2/2020 | Yamamoto | H02K 11/21 |
| 2021/0242765 A1 * | 8/2021 | Suzuki | H02K 11/21 |
| 2022/0415687 A1 * | 12/2022 | Hatano | B65G 54/02 |
| 2023/0035514 A1 * | 2/2023 | Yamamoto | B65G 43/08 |
| 2023/0286552 A1 * | 9/2023 | Baker | A63B 22/0214 |
| 2024/0043229 A1 * | 2/2024 | Baker | A63B 22/02 |

FOREIGN PATENT DOCUMENTS

| | | | |
|---|---|---|---|
| JP | 2023081016 A * | 6/2023 | B65G 47/90 |
| WO | WO-2018208658 A1 * | 11/2018 | G01G 7/02 |

* cited by examiner

*Primary Examiner* — Gene O Crawford
*Assistant Examiner* — Muhammad Awais
(74) *Attorney, Agent, or Firm* — Kathryn Perales

(57) ABSTRACT

An attractive magnetic movement and locking system uses groups of laterally stationary under-floor magnets to create an attractive potential well which magnetically attracts and pulls a mover towards the well, and locks it in place. The under-floor magnets adjust their strength through actuations or currents to move the attractive potential well, pull the mover and lock and unlock the mover's position. Locking can be accomplished with permanent magnet pairs, or with permanent magnets paired with ferrous material. Locking capability can be used instead of a counterweight to stabilize a forklift and minimize tipping risk. The system can precisely position a configuration space unit, and lock it in place for an operation. Spring-mounted mover wheels and non-backdriveable actuators increase the locking strength.

16 Claims, 14 Drawing Sheets

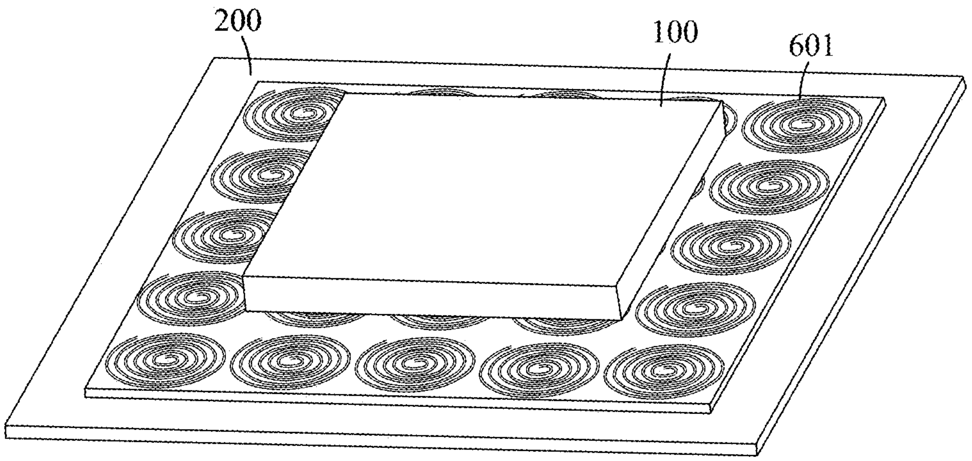
FIG. 14
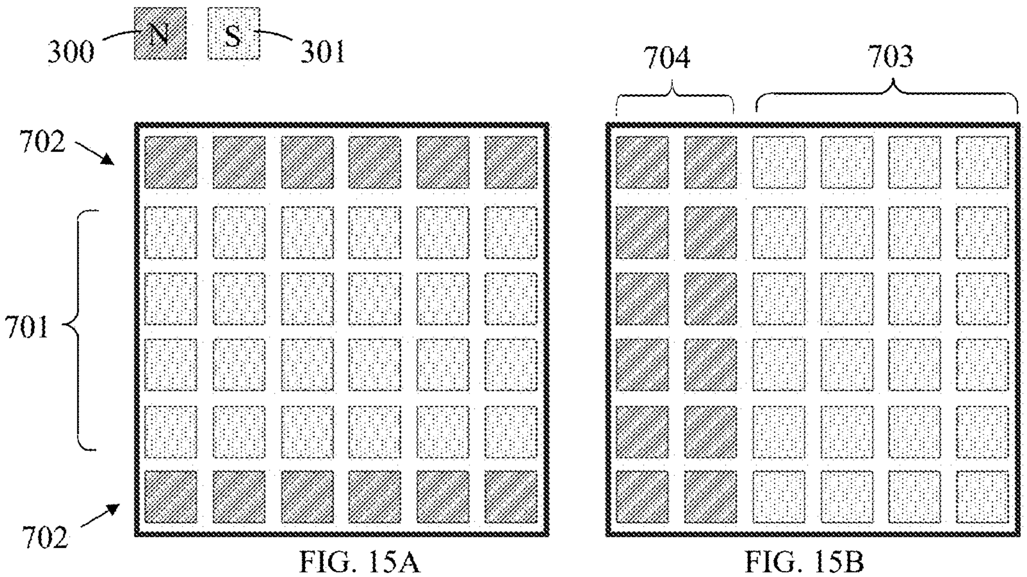
FIG. 15A
FIG. 15B
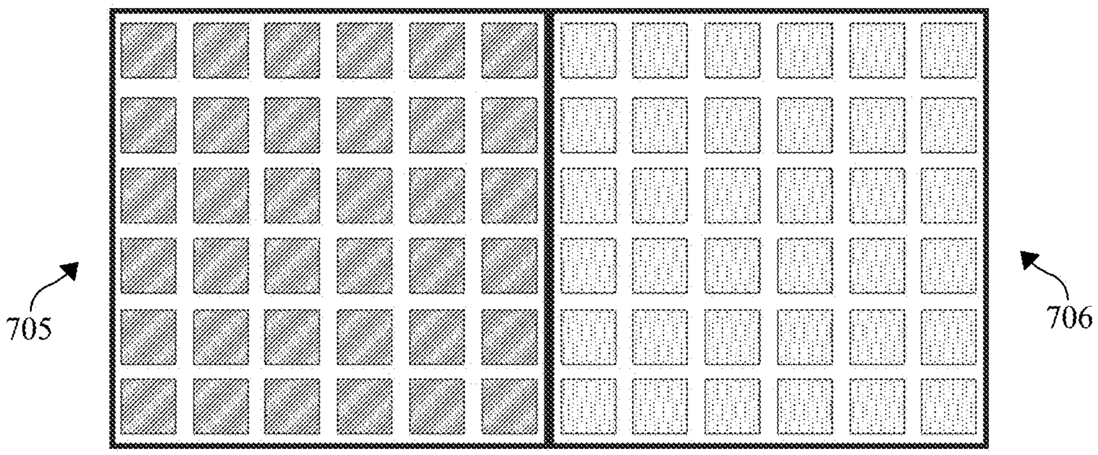
FIG. 16

STABLE ATTRACTIVE MAGNETIC MOBILITY AND LOCKING SYSTEM

CROSS-REFERENCE TO RELATED APPLICATIONS

This application is a Continuation In Part of U.S. Nonprovisional patent application Ser. No. 18/896,855, filed on Sep. 25, 2024, having the title "Stable Attractive Magnetic Mobility System Using Actuated Permanent Magnets". This application claims the benefit of U.S. Provisional Patent Application Ser. No. 63/643,403, filed on May 6, 2024, having the title "Magnetic Positional Adjustment and Locking Capability for Mobile Units in Manufacturing and Warehousing Environments", the disclosure of which is hereby incorporated herein by reference This application claims the benefit of U.S. Provisional Patent Application Ser. No. 63/584,900, filed on Sep. 25, 2023, having the title "Stable Attractive Magnetic Mobility System Using Actuated Permanent Magnets", the disclosure of which is hereby incorporated herein by reference. This application incorporates by reference U.S. Nonprovisional patent application Ser. No. 18/007,405, filed on Jan. 30, 2023, having the title "Apparatus and Applications for Magnetic Levitation and Movement Using Offset Magnetic arrays. This application incorporates by reference U.S. Nonprovisional patent application Ser. No. 18/257,287, filed on Jun. 13, 2023, having the title "Improvements to Apparatus and Applications for Magnetic Levitation and Movement Using Offset Magnetic Arrays." This application incorporates by reference U.S. Nonprovisional patent application Ser. No. 18/503,154, filed on Nov. 6, 2023, having the title "Modular Sensing Floor System with Non-Powered Non-Intelligent Mobility Units for Intelligent Warehousing." This application incorporates by reference U.S. Nonprovisional patent application Ser. No. 18/425,978, filed on Jan. 29, 2024, having the title "Position Sensing System." This application incorporates by reference U.S. Nonprovisional patent application Ser. No. 18/436,922, having the title "Magnetic Movement Using Offset Magnetic Arrays with Electromagnets."

FIELD OF THE INVENTION

Aspects herein relate generally to stable attractive magnetic mobility and locking systems that utilize actuated permanent magnets or actuated ferrous material. Aspects further relate to systems that utilize a magnetic force produced by an interaction between at least one unit cell and a configuration space unit to perform at least one attractive operation that affects a position of the configuration space unit within the configuration space.

DESCRIPTION OF THE RELATED ART

Magnetic levitation and movement systems exist that use repulsive magnetic force to lift, suspend and move heavy loads. However, such systems require large amounts of power to perform these tasks. Moreover, such systems generate significant amounts of heat, which result in inefficiencies and excessive wear on the movement system hardware. Systems that levitate objects as heavy as trains may also require physical constraints, such as rails to achieve stability and keep the levitated objects in a proper position in relation to the magnets causing levitation. When physical restraints are not present, rapid magnetic field adjustments are necessary to stabilize levitated objects.

In a warehouse, mobile carriers move across a floor between locations. When a mobile carrier reaches a destination where it will perform an operation, it may need to be precisely positioned. If the operation involves forces which can change the mobile carrier's center of gravity or move the mobile carrier, then the mobile carrier may need a mechanism to stay in place and resist unwanted movement during the operation. A robotic arm typically carries a tool at the end of the arm called an end effector/or manipulator. When combined with a mobile robotic platform, the mobile end effector is referred to as a mobile manipulator.

For precise positioning, physical guides and constraints can be configured to help the mobile carrier to get to the desired location in a desired orientation. Physical guides and constraints may not be adjustable, to allow for instances where the exact destination and/or orientation changes slightly or significantly.

Some smart AMRs can locate and orient themselves using vision or other smart systems. These systems, while more adjustable than physical guides and constraints, are currently limited as to precision.

A solution to increase the precision of placement and orientation of a mobile carrier or other unit on a floor would be desirable.

When a mobile carrier such as a forklift or robot with arm lifts a load which is not geometrically centered on the carrier, the carrier's center of gravity shifts, and a torque is created. The greater the mass of the load in relation to the mass of the mobile carrier, the greater the torque and the farther the center of gravity shifts. This can cause the mobile carrier to tip over.

One common solution to combat instability due to load lifting is use of a counterweight as part of the mobile carrier. By increasing the mass of the mobile carrier generally, and/or particularly on a side of the carrier opposite to the side where lifting occurs, the center of gravity stays closer to the geometric center of the carrier, preventing the carrier from tipping over.

A counterweight substantially increases the mass of the carrier, requiring more energy to move the carrier. A solution to prevent a mobile carrier from tipping over during lifting operation, which does not increase the mass of the mobile carrier, would be desirable.

Mobile robots sometimes need to be stationary. A robot may need to stay in one very precise location within a frame of reference, while forces are acting on the robot and pushing or pulling it away from that one stationary place. A counterweight or other heavy weight can give a robot inertia, helping it to stay in one place. A robot can travel along a guideline or rail, and clamp in place. A robot can be anchored to the floor with bolts, which makes it a non-mobile robot.

A part being operated on by a robot or other piece of machinery may itself move along a production line on a mobile carrier. The part may come under forces that would move it from its desired processing location. Parts on production lines may similarly be clamped in place while being operated on.

A solution to temporarily and releasably lock a mobile carrier or other unit in place would be desirable.

BRIEF SUMMARY

Aspects herein relate to a system comprising a work surface, a configuration space unit ("CSU"), a magnetic movement system, and an electromagnetic coil. The work surface has a configuration space associated therewith. The configuration space unit has a conveyance system and at least one of a magnet or ferrous material on a bottom thereof. Moreover, the configuration space unit is positionable within the associated configuration space of the work surface. The magnetic movement system has unit cells arranged in cooperation with the work surface. Here, each unit cell comprises at least one of a first actuator or a second actuator. The first actuator comprises a magnet coupled thereto, such that the first actuator causes movement of the magnet defining an actuated magnet. Similarly, the second actuator comprises ferrous material coupled thereto, such that the second actuator causes movement of the ferrous material. Each unit cell can additionally have an electromagnetic coil. In this regard, the magnetic movement system is configured such that a magnetic force produced by an interaction between at least one unit cell and a configuration space unit performs at least one attractive operation that affects a position of the configuration space unit within the configuration space of the work surface. Multiple unit cells can be grouped into a magnetic movement system module, which can in turn have a conveyance system.

Unit cell magnets or ferrous material move towards and away from CSU magnets, causing repulsive and/or attractive magnetic forces, which can cause the CSU to accelerate, decelerate, move, spin, tilt, turn, and stop moving. The unit cells can be configured to push and pull a CSU to a very precise location and orientation; to stop the CSU in that precise position; and to magnetically lock the CSU strongly in place.

The simplest mover type of CSU is a flat platform with permanent magnets mounted underneath. A mover can have casters or wheels or other mechanism to reduce friction between itself and the floor, allowing it to move along the floor while touching the floor. This type of mover can be levitated and moved, or simply pushed and pulled along the floor by the modular floor magnets.

Any object can be carried by a CSU with appropriate size and shape for that object. An object can simply rest on the CSU, or it can be releasably attached to the CSU, or it can be permanently installed on the CSU. For example, a CSU can carry a robot from one location to another. The robot can simply rest on top of the CSU, or it can be releasably fastened to the CSU, such as with a seatbelt. The robot can be “permanently” bolted onto the CSU.

A CSU can carry a forklift, or the CSU can be a forklift. When the CSU and forklift reach their destination, the unit cells beneath can precisely adjust the CSU’s, and therefore the forklift’s, location and orientation. The unit cells can then actuate to cause a strong attractive magnetic force between the floor and CSU magnets, locking the CSU and forklift in place. The appropriately strong force acts in the same way as a counterweight when the forklift lifts, and counters the torque (or moment of force) of the load, preventing tipping.

Alternatively, a regular forklift or AMR with an arm can have a mover with an array of permanent magnets mounted on its underside. This array of permanent magnets can be always close to the floor, or it can be configured to be moved up and away from the floor, and down and close to the floor as desired. The forklift or AMR (mobile unit) can move around the floor under its own power. When desired, floor magnets can interact with the mobile unit’s mover magnet array to precisely adjust the mobile unit’s location and orientation, and to lock the mobile unit in place.

A mobile unit can act like a manufacturing rotary table. The mobile unit can have a part appropriately attached to its top surface, and bring the part to a location for manufacturing or machining operations. The unit cells can then actuate to precisely adjust the position and orientation of the mobile unit, and then lock the mobile unit in place during an operation. The unit cells can then release the mobile unit, and rotate the mobile unit to the next desired orientation, and lock the mobile unit in place for another operation, just as a rotary table would do. When all operations are complete, the mobile unit can move away from the location, making room for the next mobile unit carrying a part.

BRIEF DESCRIPTION OF THE SEVERAL VIEWS OF THE DRAWINGS

FIGS. 2A, 2B and 2C illustrate the graphs in FIGS. 3A and 3B.

FIG. 14 is an isometric view from the top and side of an array of electromagnets with a mover above.

FIG. 15A is a bottom view of a mover, showing an exemplary arrangement of magnets, with mover magnets arranged in an attractive configuration (in relation to the actuated magnets) arranged along two sides, and mover magnets arranged in a repulsive configuration (in relation to the actuated magnets) covering the remainder of the mover.

FIG. 15B is a bottom view of a mover, showing an exemplary arrangement of magnets, with mover magnets arranged in an attractive configuration (in relation to the actuated magnets) covering a left portion of the mover, and mover magnets arranged in a repulsive configuration (in relation to the actuated magnets) covering the remaining right portion of the mover.

FIG. 16 is a bottom view of two movers, one covered with mover magnets arranged in an attractive configuration (in relation to the actuated magnets) and the other covered with mover magnets arranged in a repulsive configuration (in relation to the actuated magnets), and both movers laterally combined into one larger functional mover.

DETAILED DESCRIPTION

Introduction

Figure 1:
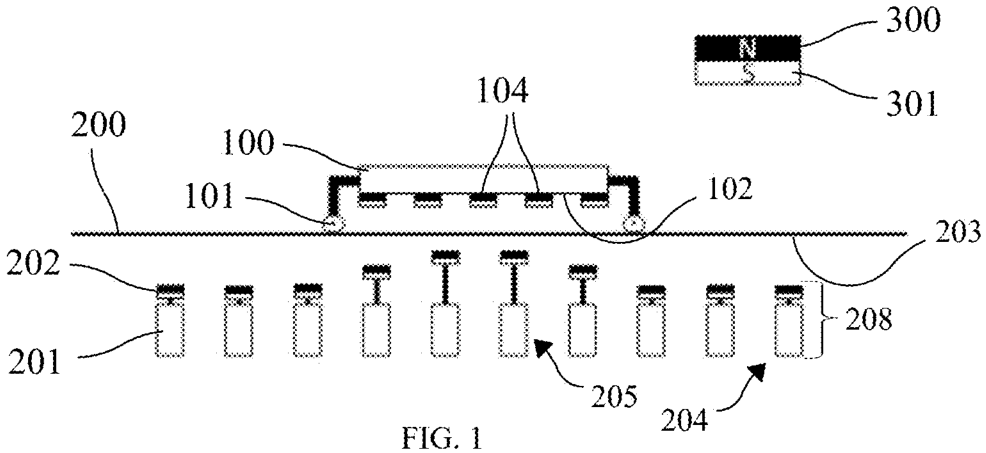
FIG. 1 is a side view of a wheeled mover on a false floor, with actuated magnets and mover magnets in a normally-attractive orientation.

By way of brief introduction, aspects herein are directed to an attractive magnetic mobility system in which a load is transported laterally over a surface using magnetic attraction. In this architecture, a load is placed on top of a configuration space unit (CSU) with wheels, casters or ball bearings, which in turn rests on a false floor. Underneath the false floor are permanent magnets or ferrous material, such as iron or low carbon steel, attached to actuators. The actuators are aligned such that they move the permanent magnets towards and away from the false floor. Permanent magnets are also attached to the underside of the wheeled CSU, making it a magnetic movement enabled "mover." The system is designed such that there is a net attraction through the false floor between the actuated magnets/ferrous material under the false floor and the magnets under the mover.

In an example implementation, a group of actuated magnets is lifted up to approach closer to the mover magnets, thus increasing attraction forces between the actuated magnets and the mover magnets, and as a result the mover is laterally pulled or dragged towards the position of the group of actuated magnets. The group of lifted actuated magnets creates a position on the false floor where the mover is most stable, a potential "attractive" well.

By adjusting the vertical positions of the actuated magnets under the floor, the position of the well changes. Assuming the new well position is close enough for magnetic forces between actuated magnets and mover magnets to interact, the mover magnets are attracted towards the new position of the well, and the mover shifts position laterally towards the new position of the well.

This drag-along system contrasts with the push-along system implemented with repulsive forces. Whereas the drag-along system attracts a mover to a moving or stationary magnetic potential well, a push-along system creates a magnetic potential hill, balancing a mover on the moving or stationary potential hill, and continually adjusting to maintain the mover's position and stability on the potential hill.

A mover can be dragged by the stable attractive magnetic mobility system in a number of ways. Mover magnets and under-floor actuated magnets can be configured to attract one another, with north polarity facing south polarity, which is referred to herein as a normally-attractive orientation. When a group of actuated magnets are lifted towards the underside of the false floor, these actuated magnets attract the mover magnets, causing the wheeled mover to shift position laterally toward the potential well caused by the magnetic interaction. To continue mover transit, some of the actuated magnets move further away from and others move closer to the false floor, causing the location of the potential well to shift in a desired direction, thus causing the mover to continue to move laterally in that direction.

Another method involves using actuated magnets and mover magnets which are configured to repel each other, for example, with the same polarity facing each other, which is referred to herein as a normally-repulsive orientation. These actuated magnets can also be raised in a configuration that creates attractive forces and a potential well, dragging a mover along towards the potential well, or parking the mover at the potential well.

Electromagnets can be used in addition to, or instead of the under-floor actuated magnets, to create and/or fine-tune a potential well. Permanent electromagnets or electropermanent magnets can also be used in the mover or under the floor.

U.S. patent application Ser. Nos. 18/007,405, 18/257,287 and 18/436,922 are incorporated by reference in their entirety, and describe a transport system, e.g., using repulsive magnetic force to levitate and push loads across a lateral surface. A system which uses repulsive force to levitate objects may utilize physical constraints, rapid adjustments of lifting forces, etc., in order to maintain stability and balance of the levitated objects, as set forth in the above, incorporated applications.

This disclosure describes structures and methods using the magnetic mobility system previously described in the above listed patent applications, for precise adjustment of orientation and location of a mover/CSU, and for strongly and releasably locking a mover/CSU in place. A mover is anything which has permanent magnets mounted on its underside. Actuated magnets associated with a floor can interact with mover magnets which are on or above the floor, creating attractive and repulsive forces. Actuated ferrous material associated with a floor can interact with mover magnets which are on or above the floor, creating attractive forces.

Attractive Magnetic Mobility

Referring now to the drawings, and in particular, to FIG. 1, a magnetic mobility system is provided, which requires minimal effort to maintain stability and balance. The attractive magnetic mobility system, shown in FIG. 1, allows non-powered movers 100 to move laterally through a configuration space while being supported and stabilized by a false floor 200 (e.g., a work surface). The movers 100 (e.g., configuration space units) can be supported by support structures 101, e.g., wheels, casters, ball bearings, or other low friction/low resistance structures (conveyance system). Alternatively, the movers can rest on a slippery surface like ice or a grease or oil or a soap-covered surface (also a type of conveyance system). Multiple permanent magnets 104 are attached to the underside 102 of each mover 100.

Underneath the false floor, multiple actuators 201 (e.g., linear actuators) are arranged with magnets 202 (e.g., permanent magnets) mounted on top of each (the combination being a unit cell 208). Each actuator can extend and lift its magnet 202 up towards and closer to the underside 203 of the false floor 200 and the underside 102 of a mover 100 (see extended unit cell 205), and each actuator 201 can retract and lower its magnet 202 down away from and further away from the underside of the false floor and the underside of a mover (see retracted unit cell 204).

Figure 25:
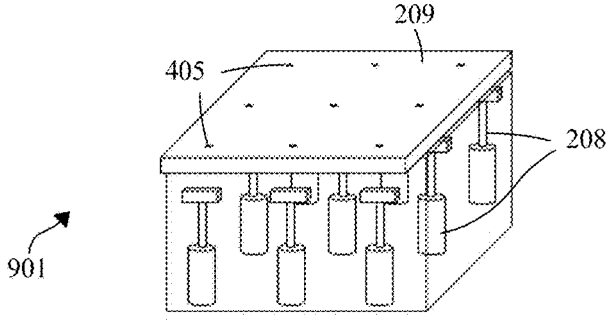
FIG. 25 shows one exemplary magnetic movement system module/modular platform with its own false floor.

The under-floor magnets 202 can be actuated and moved towards and away from the false floor 200 and movers 100 there above using alternate structures and/or methods, such as rotary actuators. Each under-floor magnet 202 can be actuated individually, or each individual actuator 201 can move multiple magnets 202. Electromagnets can be utilized in addition to, or in lieu of permanent magnets. Thus, each actuator 201 can be associated with at least one permanent magnet, at least one electromagnet, or a combination thereof. The under-floor magnets and actuators can be mounted on top of (or within) modular powered platforms (e.g., a modular magnetic movement system) which may be installed under the floor/work surface, or each modular powered platform may itself incorporate a "false floor" 209 which isolates the actuated magnets from the movers as shown in FIG. 25.

As used herein, "platform magnets" has the same meaning as "actuated under-floor magnets." The modular platforms can be stationary and permanently installed, or they can be temporarily installed in place, and can move to new locations under the floor, or may themselves move to a new location along with a piece of the "false floor".

The under-floor magnets 202 are adjusted to interact with mover magnets 104, to cause an attractive magnetic force of appropriate strength and direction to cause the mover to move in a desired way.

One way to create this attractive force is to orient the magnets on the under-floor actuators 201 such that their polarity faces an opposite pole in the mover (for example a North pole on the actuator magnets face a South pole on the mover magnets). This geometry is illustrated in FIG. 1—each magnet is shown with a black section that is a North pole 300 and a white section that is a South pole 301.

This arrangement of magnets can be opposite to that used for magnetic levitation. In magnetic levitation, the mover magnets and the actuated magnets under the false floor are aligned such that there is net repulsion between the mover magnets and the actuated magnets. These two different architectures can be thought of as creating a potential hill in the repulsive case and creating a potential well in the attractive case.

To illustrate this effect, a 2D array of actuated permanent magnets was simulated whose actuated positions were optimized to create a vertical force on the mover 100 in the Z direction when the mover 100 is centered over the actuated magnets and no lateral forces in the X or Y directions. These optimized actuations were then used in a second simulation in which the positions of the actuated magnets are fixed in the optimized positions while the center of the mover 100 is swept laterally relative to the actuated magnets. The simulation geometry is shown in FIGS. 2A, 2B and 2C.

Figure 2A:
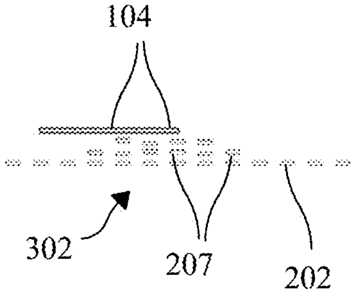
FIG. 2A is a side view of a mover (wheels not shown), shown in a first position to the left of and over a set of actuated magnets.
Figure 2B:
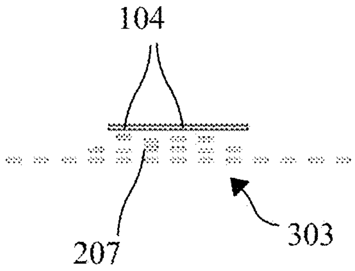
FIG. 2B is a side view of the mover shown in FIG. 2A, shown in a second position, closer to centered over the set of actuated magnets shown in FIG. 2A.
Figure 2C:
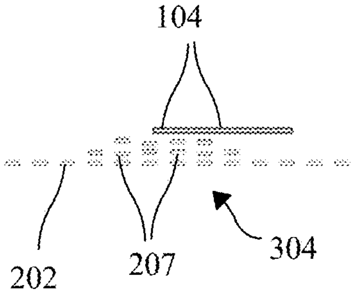
FIG. 2C is a side view of the mover shown in FIGS. 2A and 2B, shown in a third position to the right of and over the set of actuated magnets shown in FIGS. 2A and 2B, which is in a constant configuration.

FIGS. 2A, 2B and 2C show the position of the mover magnets 104 in three locations. The left-most example, FIG. 2A, illustrates a location of the mover magnets 104 to the left of the actuated magnet 207 distribution. The center example, FIG. 2B, illustrates a location of the mover magnets 104 at the center 303 of the distribution; and the right-most example, FIG. 2C, illustrates a location of the mover magnets 104 to the right 304 of the distribution. In the simulations, the mover is swept continuously from the left to the right of the distribution. Two simulations were run for two magnetic configurations, one in which the magnets are oriented for net attraction between the mover and actuated magnets and another where they are oriented for repulsion.

Figure 3A:
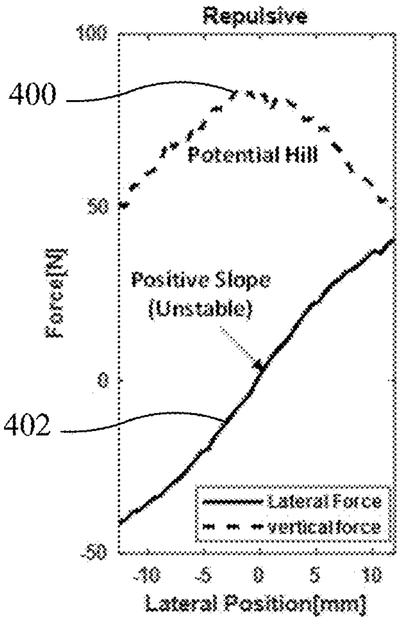
FIG. 3A is a graph illustrating magnetic forces generated by the interaction of the mover magnets and actuated magnets shown in FIGS. 2A, 2B and 2C, when the magnets are configured in a normally-repulsive orientation.
Figure 3B:
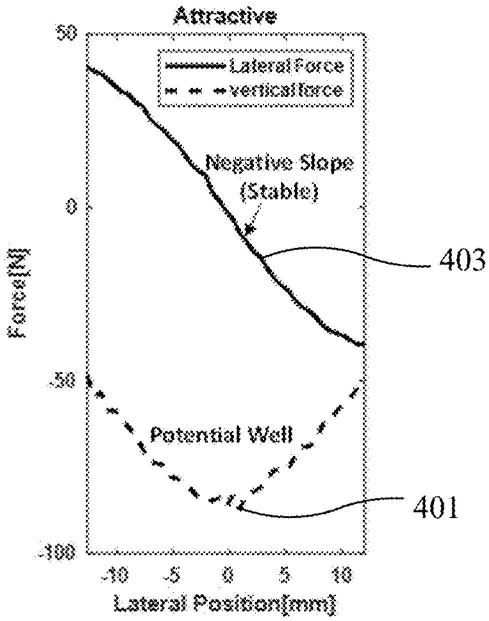
FIG. 3B is a graph illustrating forces generated by the interaction of the mover magnets and actuated magnets shown in FIGS. 2A, 2B and 2C, when the magnets are configured in a normally-attractive orientation.

FIGS. 3A and 3B show the result of the simulations. FIG. 3A shows the repulsive case, while FIG. 3B shows the attractive case. In the repulsive case of FIG. 3A, there is a potential hill 400 near the center 303 (FIG. 2B) of the actuated magnet distribution, whereas the attractive case of FIG. 3B has a potential well 401. The simulations also show that lateral forces are present as the mover is shifted away from the center of the sweep. In the repulsive case, the lateral forces 402 act to push the mover away from the center of the distribution, making the center position unstable. In other words, a mover centered on the repulsive hill will tend to get pushed to the side and off of the hill. By contrast, the lateral forces 403 in the attractive case act to push the mover back towards the center of the potential well and therefore the center of the well 401 is a stable position. These lateral forces create stability in the lateral directions while the false floor provides stability vertically. Similar to the restoring forces that keep a mover at the center of attractive well, the well also creates a restoring torque that prevents the mover from rotating inside the well.

Figures 10A, 10B, 10C:
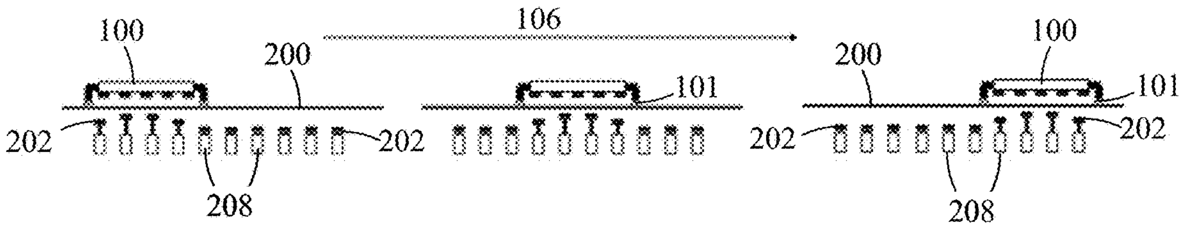
FIG. 10A is a side view of a mover in a first position, before it is being dragged to the right by lateral attractive forces between the mover magnets and actuated magnets set up in a normally-attractive orientation
FIG. 10B is a side view of the mover shown in FIG. 10A in a second position, having been dragged to the right over time from the first position shown in FIG. 10A.
FIG. 10C is a side view of the mover shown in FIGS. 10A and 10B in a third position, having been dragged further over time to the right from the second position shown in FIG. 10B.

FIGS. 10A, 10B and 10C are simple illustrations of how the under-floor unit cells 208 actuated magnets 202 can be raised and lowered to create a moving potential well that attracts and drags a mover 100 along the floor 200 (direction of travel indicated by arrow 106). Note that the actuated magnets 202 do not move laterally; each one only moves up and down, towards and away from the false floor 200. Groups of actuated magnets will raise and lower in precise locations and formations, based upon the target mover's area, shape, mass, center of gravity, current location, current velocity, desired interim and ultimate destination, desired path, and desired velocity to form a moving potential well.

A potential well can also be created by actuated ferrous material, which can interact with permanent magnets under a mover. For this method, some or all of the under-floor actuators have ferrous material mounted thereon, rather than permanent magnets. Magnetic interaction of the actuated ferrous material with the permanent magnets under the movers causes attractive forces which can pull or drag the mover along in the same way as actuated magnets in a normally-attractive orientation would do. Alternatively, movers can have ferrous material instead of permanent magnets, and the ferrous material can be pulled by the under-floor actuated magnets.

In many magnetic interaction systems, particularly those involving a permanent magnet and ferrous material (also called a ferromagnet), or two permanent magnets with oppositely facing poles, the resultant force profile exhibits characteristics beneficial for creating stable positions. Specifically, when a mover magnet is directly aligned (in X and Y coordinates) over an actuated ferromagnet or an oppositely poled magnet, the interaction forces behave analogously to a spring, providing a restoring force if the mover is slightly laterally displaced. This spring-like behavior is strongest with direct alignment. However, if the mover magnet is displaced laterally from the platform element by a significant amount, for instance, more than approximately one-fifth of the magnet's width, this desirable spring-like characteristic diminishes rapidly, and can even lead to negative stiffness, destabilizing the mover. Consequently, for creating a robust and stable attractive potential well where lateral forces (Fx, Fy) and rotational torque (Tz) are ideally zero at the well's center, and where these forces/torques provide a strong restoring effect (e.g., Fx becomes negative with increasing positive X displacement, and positive with increasing negative X displacement), it is advantageous to maximize the number of directly aligned magnet-ferromagnet or magnet-magnet pairings and minimize pairings that are laterally offset, particularly in the range of 1 to 2 times the magnet width where lateral forces can increase in the direction of displacement before restoring.

An alternative approach to creating and moving a potential well for precise, incremental movement involves actuating groups of elements (which can be individual ferromagnets or permanent magnets, corresponding to the actuated components described elsewhere as, for example, actuated magnets 202 or actuated ferrous material 509) that are arranged and shaped to closely correspond to the pattern of permanent magnets on the underside of the mover. This method allows for a "stepper-like" motion of the mover. By selectively actuating a specific group of magnets/ferrous material, a strong, well-defined attractive potential well is formed directly above the actuated group, pulling the mover into alignment with that group.

A specific embodiment of this stepper-like movement system is illustrated in part in FIGS. 37, 38A, 38B and 38C. In this embodiment, the actuated elements (e.g., ferromagnetic cores or permanent magnets) 1100 are arranged in a grid. For example, individual actuated elements 1100 can have a size (e.g., width or diameter) that is substantially similar to the size of the permanent magnets 104 on the mover 100. These actuated elements 1100 can be spaced relatively closely, for instance, with a center-to-center spacing equal to their size. These actuated elements 1100 are organized into a plurality of distinct groups, for example, nine distinct groups (1101*a*, 1101*b*, 1101*c*, 1101*d*, 1101*e*, 1101*f*, 1101*g*, 1101*h*, 1101*i*, collectively referred to as groups 1101) arranged in a 3×3 repeating tile pattern, as shown conceptually in FIG. 35, where each square represents an element 1100 belonging to a specific group. This 3×3 tiled pattern of groups repeats across the work surface. The permanent magnets 104 on the underside of the mover 100 are preferably arranged with a spacing such that they align with elements 1100 of the same group designation when the mover 100 is centered over any instance of that group pattern. For example, if the actuated elements 1100 are 1-inch squares with 1-inch center-to-center spacing, the groups 1101 form 3-inch by 3-inch tiles. The mover magnets 104 would then be spaced at 3-inch intervals to align with, for example, all actuated elements 1100 designated as group 1101*a* when the mover 100 is positioned over that part of the pattern.

Actuation is simplified in this embodiment. All platform elements 1100 within a single designated group 1101 (e.g., all elements of group 1101*a*) are actuated simultaneously by their respective actuators 201. Actuation typically involves moving the group of platform elements 1100 vertically towards the mover 100 ("all the way up") to create a strong attraction, or retracting them ("all the way down") to release the mover 100 from that specific well. Normally, only one group 1101 is actuated (extended) at any given time in the vicinity of the mover 100. When a group 1101 is actuated, the mover magnets 104 are attracted to and align directly above that specific actuated group, creating a very stable position due to the maximized alignment of mover magnets 104 over extended platform elements 1100, resulting in strong positive stiffness in X, Y, and Tz.

Figure 38A:
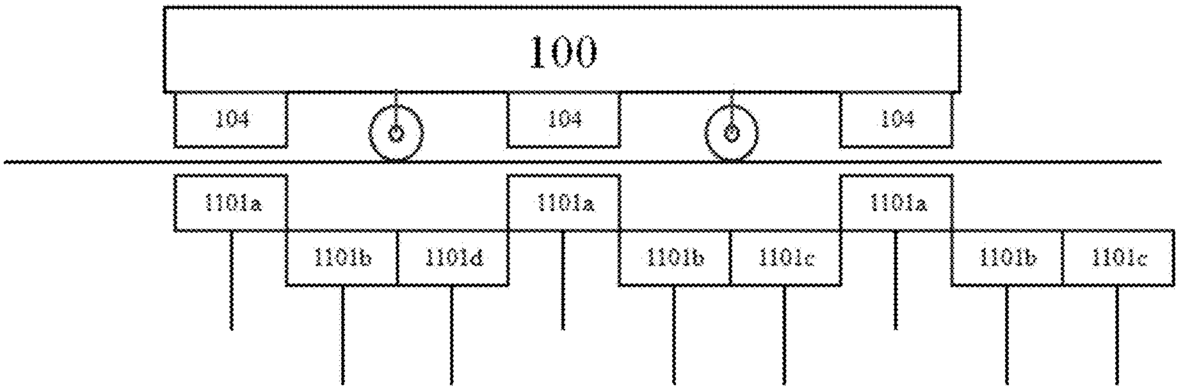
FIG. 38A is a side view of a mover being held in a first stable position by actuated elements.
Figure 38B:
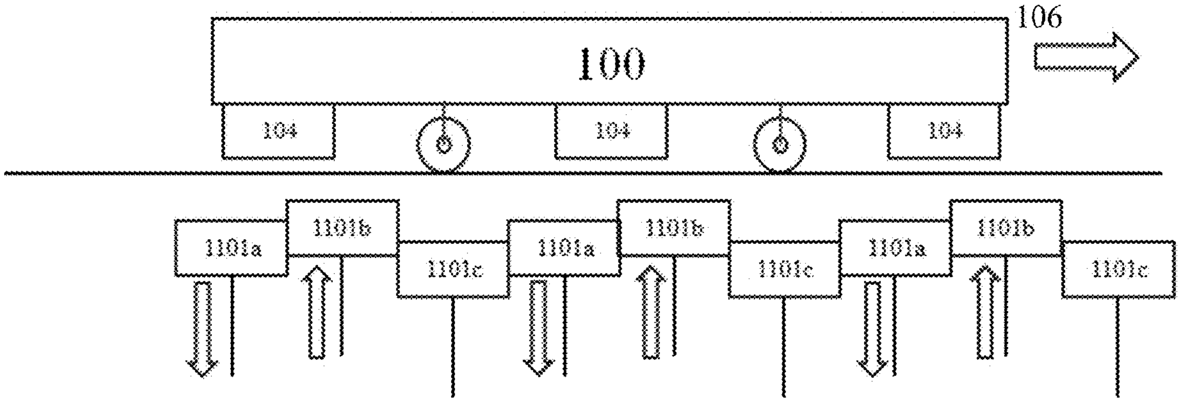
FIG. 38B is a side view of the mover of FIG. 38A, being attracted and moved to the right, through changes in actuated positions of the elements.
Figure 38C:
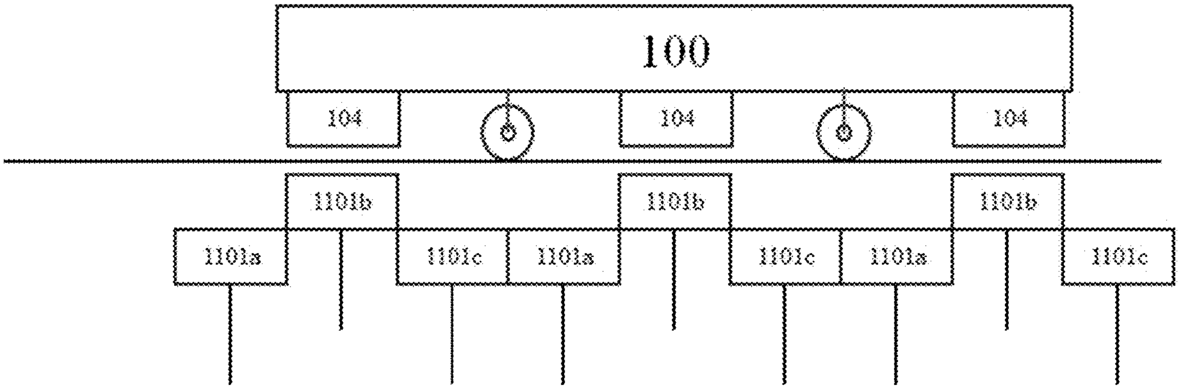
FIG. 38C is a side view of the mover of FIGS. 38A and 38B, now shown being held in a second stable position by actuated elements.

Incremental movement of the mover 100 is achieved by sequentially actuating adjacent or strategically chosen groups 1101, as illustrated conceptually in FIGS. 38A 38B and 38C for a single step of rightward movement. For example, consider the 3×3 arrangement of groups as labeled: [1101*a*] [1101*b*] [1101*c*] [1101*d*] [1101*e*] [1101*f*] [1101*g*] [1101*h*] [1101*i*]. If the mover 100 is initially positioned over an actuated group 1101*a* (as shown in FIG. 38A), a subsequent movement step to the right towards group 1101*b* can be initiated. To achieve this, group 1101*a* would be actuated downward (or its attractive force significantly reduced), and group 1101*b* would be actuated upward to create an attractive potential well. FIG. 38B conceptually illustrates the mover 100 in transit, being pulled from its previous alignment over group 1101*a* towards the newly attractive group 1101*b*. The mover 100 then settles into alignment directly above the actuated group 1101*b*, as depicted in FIG. 38C.

This process of de-actuating the current group and actuating an adjacent target group can be repeated to achieve further incremental movements across the work surface. For example, to continue moving rightwards from the position shown in FIG. 38C (aligned over group 1101*b*, refer to FIG. 37), group 1101*b* would be de-actuated downwards and group 1101*c* would be actuated upwards, causing the mover to shift and align over group 1101*c*. Similarly, to move in the Y direction by one platform element size, from an alignment over, for instance, group 1101*a*, group 1101*a* would be actuated downwards and group 1101*d* would be actuated upwards, causing the mover 100 to shift through an in-transit state and then align over group 1101*d*. By selecting appropriate sequences of group actuations, the mover 100 can be stepped in X or Y increments equivalent to the element 1100 size. Due to the 3×3 tiled pattern of groups (1101) repeating across the work surface, as described in relation to FIG. 37, continuous movement in any cardinal direction is achieved by sequentially actuating the corresponding groups within each successive tile. For instance, after moving rightwards through groups 1101*a*, 1101*b*, and 1101*c* within one tile, further rightward movement would engage the group corresponding to 1101*a* in the next adjacent tile to the right, and so on, effectively allowing the sequence of group actuations to "loop" for extended travel over the work surface.

While this system can be implemented with permanent magnets for both the mover magnets 104 and the actuated elements 1100, a preferred embodiment utilizes permanent magnets on the mover 100 and ferrous material for the actuated elements 1100. This preference arises because closely spaced actuated permanent magnets can experience significant repulsive or off-axis attractive forces from neighboring platform magnets when moving past each other during actuation, potentially complicating actuator 201 design or causing unwanted motion. Using ferrous elements 1100 mitigates these inter-element forces. However, the system can also be configured with actuated permanent magnets (as elements 1100) and ferrous material on the mover 100 (in place of or in addition to mover magnets 104).

The novelty of this stepper-like configuration lies significantly in the precise spatial alignment and sizing: the platform elements 1100 within an actuated group effectively form a shape that mirrors the pattern of a subset of the mover magnets 104. This direct and extensive alignment when a group 1101 is actuated results in very strong and sharply defined attractive potential wells at multiple discrete locations across the work surface. This leads to high positional stability and strong restorative forces (positive stiffness) when the mover 100 is centered over an actuated group 1101. The primary advantage is the ability to achieve precise, incremental movements with a simplified control scheme (on/off actuation of predefined groups 1101) and robust holding at each step.

Attraction Using Normally-Repulsive Magnets

Figure 4:
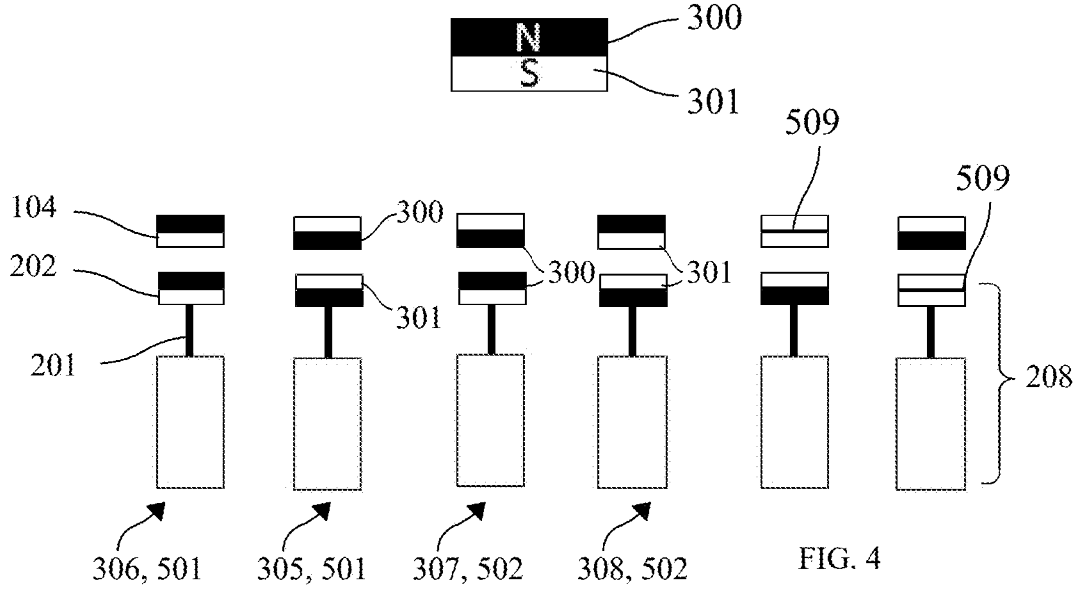
FIG. 4 is a side view of mover magnets and actuated magnets set up in a normally-attractive orientation and a normally-repulsive orientation. Ferrous material is also shown substituted for a mover magnet, or substituted for an actuated magnet.

The above analysis shows a method for creating attractive forces using opposite facing magnets in the mover and actuators. See FIG. 4. In other words, the polarity of the magnets 202 on the actuators 201 is aligned in the opposite direction as the magnets 104 on the mover. This orientation has, in the illustrated example, a North pole 300 on the mover facing a South pole 301 on the actuators 305 (or vice versa 306), and this is referred to herein as the normally-attractive orientation. Ferrous material 500 can replace either the mover magnets or the actuated magnet, as shown in FIG. 4. The remaining set of magnets exerts attractive magnetic force on the ferrous material in the same way that magnets in a normally-attractive orientation would, usually with less force.

Conversely, aspects herein can use an architecture where a North pole 300 in the actuators faces a North pole 300 in the mover 307 (or South facing South 308). This is referred to herein as the normally-repulsive orientation. The normally-attractive 501 and normally-repulsive 502 architectures, as well as attractive architectures using ferrous material 509 can be used in any combination, as illustrated in FIG. 4.

The normally-repulsive architecture is used for magnetic levitation, and it can also be used to create an attractive well between the mover and actuated magnets, similar to the normally-attractive case. To understand this effect, a simulation was created to explore the vertical force exerted by two magnets of the same type, size and strength separated by a fixed vertical gap with magnetizations oppositely polarized such that the two magnets repel when they are directly underneath each other (i.e. the normally-repulsive case).

Figure 5:
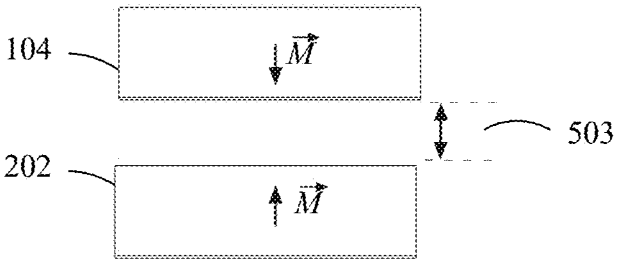
FIG. 5 is a side view of a mover magnet and an actuated (platform) magnet set up in a normally-repulsive configuration, to illustrate the simulation whose data is shown in FIG. 6.
Figure 6:
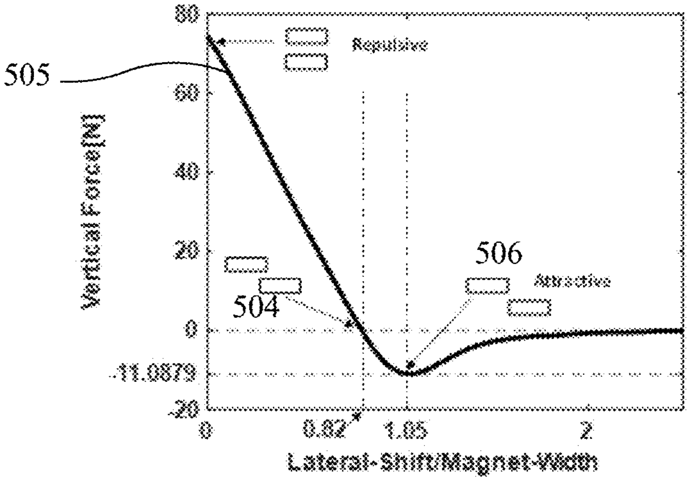
FIG. 6 is a graph illustrating vertical force generated between the two magnets of FIG. 5, as the position of the platform magnet in relation to the levitated magnet moves laterally from center to the right.

In the simulation the vertical gap 503 between magnets was kept fixed as shown in FIG. 5, and varied the lateral position of the top magnet 104 relative to the bottom magnet 202. The simulated results for the vertical force on the top magnet 104 as a function of lateral displacement is shown in FIG. 6.

Figure 7:
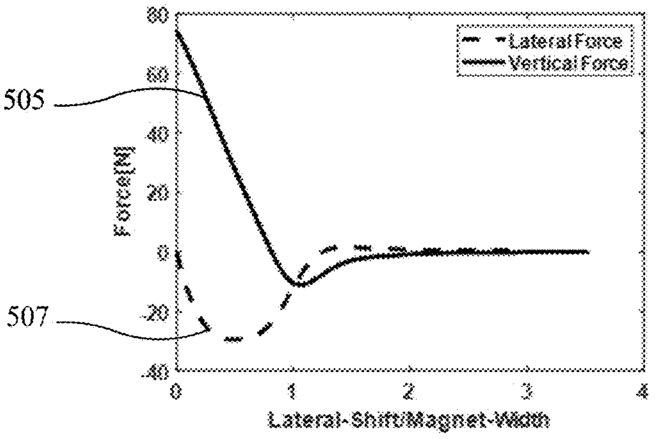
FIG. 7 is a graph illustrating both lateral and vertical force generated between the two magnets of FIG. 5, as the position of the platform magnet in relation to the levitated magnet moves laterally from center to the right.

The simulations show that vertical forces can switch between repulsive and attractive. For instance, for the simulated system, the simulations show that when the magnets are laterally displaced, e.g., more than about 82% of the width of the magnet (illustrated at position 504) in this example, the vertical force 505 on the levitated magnet 104 switches from repulsive to attractive. The simulations also show that significant lateral forces are present when the two magnets are displaced laterally (illustrated at position 506). FIG. 7 is a plot of the simulated forces in both the vertical 505 and lateral 507 directions as the two magnets are displaced laterally.

These simulations further show that a system with a normally-repulsive architecture can create a net attractive vertical force on a mover using magnets that are aligned in the normally-repulsive configurations, and that significant lateral forces can also be obtained. To demonstrate this at the system level, a constrained optimization was performed on a system consisting of an array 206 of actuated permanent magnets 202 and a mover 100 situated above the actuated magnets. The magnets in the simulations are configured in the normally-repulsive orientations. An optimization was performed to find the vertical actuations needed to provide a net attractive vertical force (an attractive well) on the mover 100 and no lateral forces.

Figure 8A:
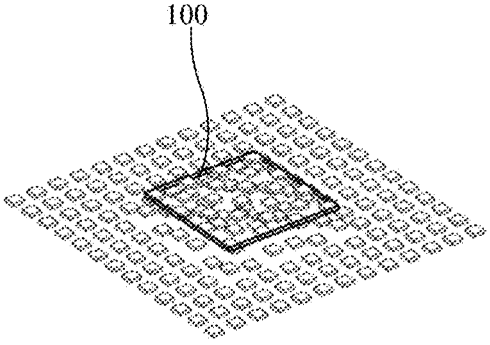
FIG. 8A shows an isometric view from the side and top, as well as a side view from the left, of a mover (wheels not shown) being held in a stable position by actuated platform magnets in an exemplary optimized configuration using normally-attractive orientation.
Figure 8B:
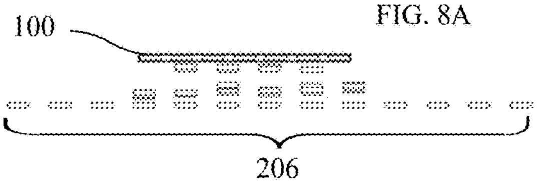
FIG. 8B shows a top view, as well as a side view from the right, of a mover (wheels not shown) being held in a stable position by actuated platform magnets in an exemplary optimized configuration using normally-attractive orientation.
Figure 8B:
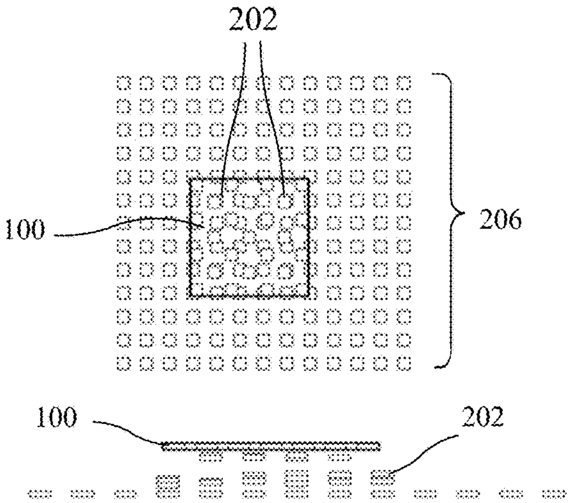

The simulation geometry and optimized actuations are shown in FIGS. 8A and 8B. FIGS. 8A and 8B show the position of the mover 100 and the optimized actuation positions of the platform magnets 202 that give a net attractive force in the Z direction and zero lateral forces.

A separate simulation was then performed with specific parameters, such as mover size (10 inch square), magnet strength (N52 grade), magnet size (one inch square by 0.25 inch depth), and magnet spacing (modified checkerboard pattern with 3 inch X and Y distance between centers of magnets on mover, and simple grid with 2 inch X and Y distance between centers of magnets on platform), in which these optimized actuations were fixed in place and the mover was displaced laterally from the center of the attractive well created by the actuated magnets.

Figure 9:
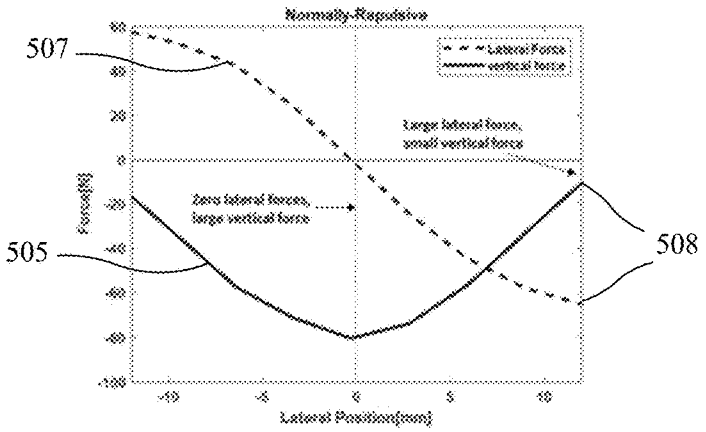
FIG. 9 is a graph illustrating both lateral and vertical forces generated between mover magnets and actuated magnets set up in a normally-repulsive orientation, as their relative lateral positions change.

The simulation results are shown in FIG. 9. Similar to the normally-attractive architecture, the results show that even in this normally-repulsive orientation, an attractive well is created between the mover and the actuated magnets. These results suggested an appealing control strategy. As the mover is displaced from the center of the well, the vertical force 505 decreases while the restoring lateral force 507 increases. In this particular case, when the center of the mover reaches a predetermined position, e.g., when the mover is approximately 15 mm from the center of the well (see position 508) in this example, the net vertical force is close to zero while the lateral restoring force is greater than 70 Newtons.

A propulsion strategy in which the actuated magnets are moved to set points which create a well that is always in front (e.g., around 10 mm in front in an illustrative example) of a wheeled mover, creates a strong constant lateral force for propulsion, and diminishes the detrimental impacts of increased friction due to the attractive vertical force in the well. When not in motion, the magnetic interactions can serve as a parking brake—by positioning the wheeled mover at the location where lateral forces are minimized while negative Z forces are maximized, the wheeled mover is kept locked in place.

Aspects herein provide that the normally-repulsive architecture can be operated in at least three different modes of magnetic motion:

- Full Levitation—In this case, full levitation of the mover can be achieved using active feedback and a control loop without the use of wheels or other friction-reducing means between the mover and the floor. The mover is both levitated and propelled using magnetic forces. The control loop can be PID (proportional-integral-derivative), or MPC (model predictive control), or another type.
- Wheeled repulsive—In this case, the system consists of a mover(s) on a false floor, usually with some means of reducing friction between the mover's bottom surface and the floor's top surface, like wheels, casters, grease or soap, and repulsive magnetic forces are used to push the mover across the false floor. The false floor provides vertical support, stability and balance while magnetic forces are used to push the mover laterally using a much less stringent control loop.
- Wheeled attractive—In this case, the system consists of a mover on a false floor, and stable attractive magnetic forces are used to drag the mover across the false floor. The false floor provides vertical support and balance while magnetic forces are used to pull the mover across the false floor without as much need to use a PID (or similar) control loop.

A mobility strategy is described herein using attractive net force between a set of actuated magnets and a wheeled mover. The key difference between this attractive architecture and a repulsive architecture in a mobility application is that a wheeled mover being pushed with repulsive forces is unstable to external disturbances, and requires some amount of active feedback to keep the mover in a stable lateral location; while the attractive arrangement naturally pulls the mover to a stable lateral location, and does not require any (or minimal) active feedback. In the case of repulsive levitation, the active feedback requirements become more demanding, requiring a faster response feedback loop.

In an active feedback scheme, the position of the mover is monitored using a set of sensors, such as optical cameras, IR cameras, LIDAR, RADAR, pressure sensors, ultrasonic sensors, microphones, capacitive or inductive sensors, depth sensors, Hall effect sensors or color sensitive photodiodes. When the position of the mover deviates from a target set point, within a repulsive architecture, restoring forces are applied to nudge the mover back to the set point. These restoring forces can be accomplished, for example, through actuating permanent magnets or through using electromagnetic coils which may be integrated into the false floor. A control loop can be implemented to run the position detection and restoring force application in a loop. A Proportional-Integral-Derivative (PID) control loop is a classical way to control such a system.

By contrast (as described above), the lateral forces in the attractive system makes the system stable to lateral movements. In a mobility application using an attractive well, the vertical positions of the actuated magnets are adjusted to move the potential well laterally. Since the mover is attracted to the center of the well, the actuated magnets can be used to drag the wheeled mover across the false floor in a controlled manner. This is illustrated in FIGS. 10A, 10B and 10C.

In an attractive system with normally-attractive oriented magnets, a wheeled mover can easily be kept stably stationary in one place, over a potential well, with no control loop needed. Using normally-repulsive oriented magnets, a potential well can similarly be created to attract and hold a wheeled mover over the location of the potential well, keeping it stationary with a minimal control loop.

Figures 11A, 11B:
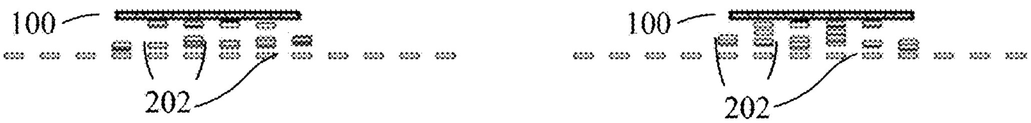
FIG. 11A is a first side view of a mover in a first position, being attracted by actuated platform magnets set up in a first exemplary optimized configuration using normally-attractive orientation.
FIG. 11B is a second side view of the mover of FIG. 11A at a slightly later time, having been dragged slightly to the right by actuated platform magnets which have adjusted their exemplary optimized configurations and actuated positions, still using normally-attractive orientation.
Figures 12A, 12B, 12C:
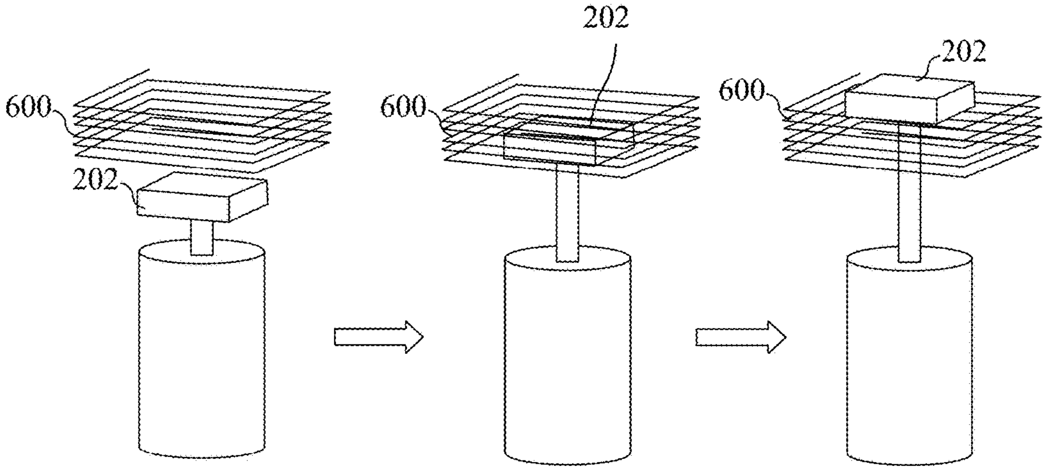
FIG. 12A is a side view of a unit cell, comprising a permanent magnet mounted on a linear actuator, combined with an electromagnetic coil, where the permanent magnet is retracted below the coil.
FIG. 12B is a side view of the unit cell of FIG. 12A, showing the permanent magnet actuated up to a position inside of and level with the coil.
FIG. 12C is a side view of the unit cell of FIGS. 12A and 12B, showing the permanent magnet further actuated up to a position above the coil.
Figure 13:
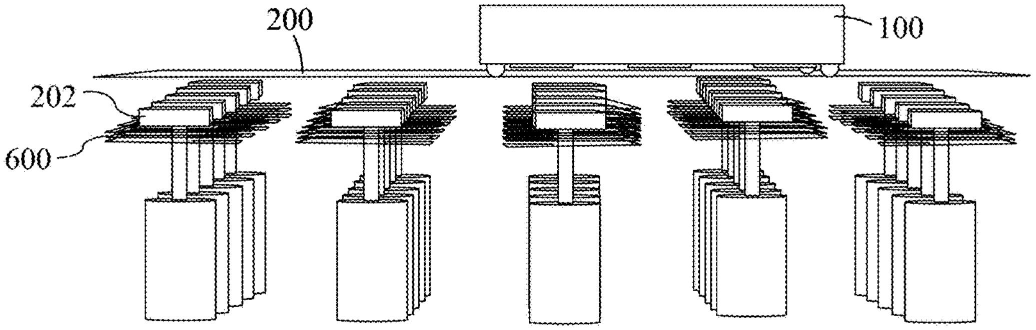
FIG. 13 is a side view of an array of permanent magnets mounted on linear actuators and combined with electromagnets, underneath a floor, with a mover above the floor.

In an exemplary implementation, numerical modeling is used to find the optimal positions of the actuated magnets as a function of mover position. FIGS. 11A and 11B show two example optimized actuated magnet positions for two different mover positions. As the actuated magnets 202 are adjusted, the mover 100 will be dragged along a desired path across the false floor, for example from an initial position shown in FIG. 11A to a second position slightly to the right, shown in FIG. 11B. For this approach, it is not necessary to adjust actuated magnet positions to apply restoring forces. Instead, actuated magnet positions are adjusted to generate the path which the mover will follow. The system still must ascertain the position of the mover, for example using sensors as described previously, so that the potential well is always formed at the right position and at the right time to control the path of the mover.

Figure 26A:
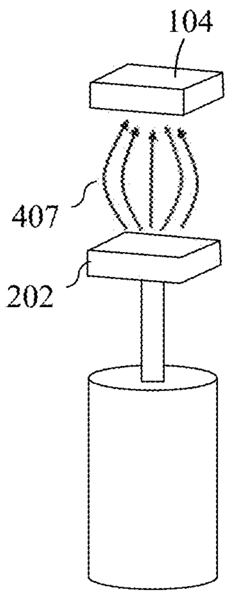
FIG. 26A is a schematic side view of attractive magnetic force resulting from an actuated permanent magnet interacting with a mover magnet.
Figure 26B:
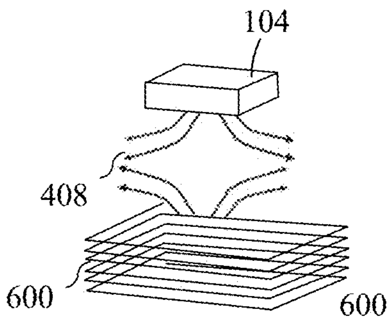
FIG. 26B is a schematic side view of repulsive magnetic force resulting from an electromagnetic coil interacting with the mover magnet shown in FIG. 26A.
Figure 26C:
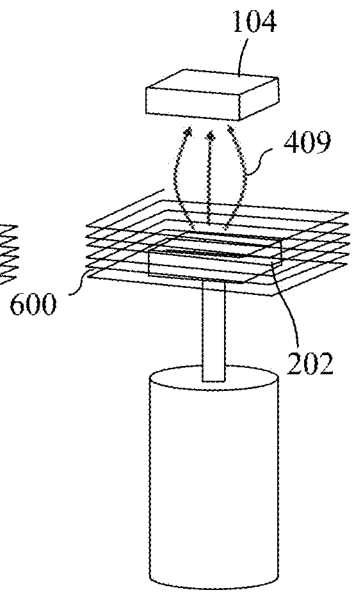
FIG. 26C is a schematic side view of combined and therefore reduced attractive magnetic force resulting from both the actuated permanent magnet of FIG. 26A and the electromagnetic coil of FIG. 26B acting on the mover magnet shown in both FIGS. 26A and 26B.

In other embodiments, electromagnets can also be incorporated into the attractive magnet mobility system. As examples, the electromagnets 600 can be embedded around actuated permanent magnets 202 as shown in FIGS. 12A, 12B, 12C and 13, or on PCBs 601 that sit on the floor 200, above the actuated permanent magnets 202, as shown in FIG. 14. In an attractive wheeled motion system, attractive forces between actuated magnets and mover magnets holding a mover in place can be very strong, requiring a strong effort to pull the actuated magnets away, to allow the mover to move again. Instead of having the actuators pull away with great force, Permanent electromagnets, electropermanent magnets or coil electromagnets can be instantaneously used to moderate, eliminate, or counteract the magnetic field of the actuated permanent magnets, partially or fully, to ease stress on the actuator structure as it withdraws the permanent magnet. This is illustrated in FIGS. 26A, 26B and 26C. FIG. 26A schematically shows a strong magnetic attraction 407 between an actuated magnet 202 and a mover magnet 104. FIG. 26B shows a repulsive force 408 between an electromagnetic coil 600 and the mover magnet 104. FIG. 26C shows the combined forces of the actuated magnet 202 and the electromagnetic coil 600, reducing the attractive forces 409. Electromagnets can generate temporary magnetic forces of the opposite polarity of the actuated permanent magnets, in a pulse or longer, reducing the strength of the attractive magnetic field and allowing for fast decoupling of the actuated permanent magnets beneath the permanent magnets within the mover, and accelerating the transition to the next potential well. Once the actuated magnets have retracted, and the mover magnets have been decoupled from the actuated magnets, the electromagnets can turn off. Electromagnets can also be used as a safety feature, or release feature, generating temporary opposing magnetic forces to the actuated permanent magnets, thereby neutralizing actuated permanent magnet forces and allowing the removal of any magnetic or ferrous material debris which may have become coupled to the surface of the false floor. Permanent electromagnets and electropermanent magnets are able to switch their magnetic forces on and off, and thus can also be used for these purposes. In one embodiment, the actuated magnets are themselves composed of permanent electromagnets or electropermanent magnets, and can be switched on and off as desired.

In yet another embodiment, a bed of actuating permanent magnets, which may also include integrated arrays of electromagnets, generates magnetic forces to transport wheeled movers. Permanent magnets are also attached to the underside of the wheeled mover. The polarity of the magnets on the mover can be oriented such that there can be both attractive and repulsive forces generated between the actuated magnets under the false floor and the magnets on the mover. In other words, the polarity of the permanent magnets on the mover may be both North and South, and therefore generate both attractive and repulsive forces with the homogenous polarity of the actuated permanent magnets.

In such a system, a mover with attractive permanent magnets along two opposite edge rows (FIG. 15A) 701, and repulsive magnets along its inner or center rows 702, including the edges, can generate repulsive forces to push the mover in a desired direction, while providing stability to the wheeled mover by generating attractive forces along its side edges. Alternatively, using the same configuration shown in FIG. 15A, the center rows 702 of permanent magnets can generate a potential well, allowing the mover to be pulled forward, while repulsive magnets along the two outer edges 701 help to provide greater lateral force or alternatively, may reduce the effective load of the mover on the false floor, thereby resulting in faster, more responsive motion, and less wear on the casters/wheels and on the false floor.

Similarly, as shown in FIG. 15B, permanent magnets on the mover can be oriented such that the magnets on the front portion 703 of the mover have one polarity producing a net attraction with actuated magnets below, and the magnets on the back portion 704 of the mover produce a net repulsive force with actuated magnets below or vice versa. The forces imparted on the wheeled mover depend on the positions (heights) of the actuated permanent magnets beneath the false floor.

Alternatively, as shown in FIG. 16, a mover with magnets oriented for repulsive forces 705 can be connected with a mover oriented for attractive forces 706, and the load may be placed on one or the other, or both. Generally, multiple wheeled movers can be interconnected physically or operationally, thereby increasing the maximum load and the size of the load that can be carried by the combined movers. The motions of each of the wheeled movers are coordinated by the actuated permanent magnet system, allowing for multiple wheeled movers to act as a single larger mover. Permanent magnets are attached to the underside of each mover, and the configurations and polarities of the permanent magnets of each mover can be the same, or different, or have any number of combinations.

A mover with magnet configuration including sets of magnets with opposite polarities, for example similar to that shown in FIG. 15A, can be propelled using any of at least three separate control mechanisms. This mover has multiple permanent magnets mounted on its underside, including two sets of magnets with normally-repulsive orientation on opposite edges 701, and the center magnets 702 being in a normally-attractive configuration as to the actuated magnets below. The three separate control mechanisms are: 1) Arrays of actuated magnets located under the outer edges of the mover can lift up to interact with the mover edge magnets in repulsive orientation 701, thus providing repulsive forces pushing the mover forward. 2) Arrays of actuated magnets directly underneath or slightly in front of the normally-attractive mover magnets 702 can lift up to provide attractive forces to pull the mover along. 3) A combination of both propulsion strategies (1) and (2) can be implemented simultaneously.

Arrays of actuated magnets directly underneath or in front of the mover can lift up to provide attractive forces (creating a well) to the normally-repulsive mover magnets on the mover's front end, pulling the mover forward. This is simply one example of a configuration of mover magnets with varied magnetic orientations that can be propelled by the under-floor actuated magnets.

Figure 23:
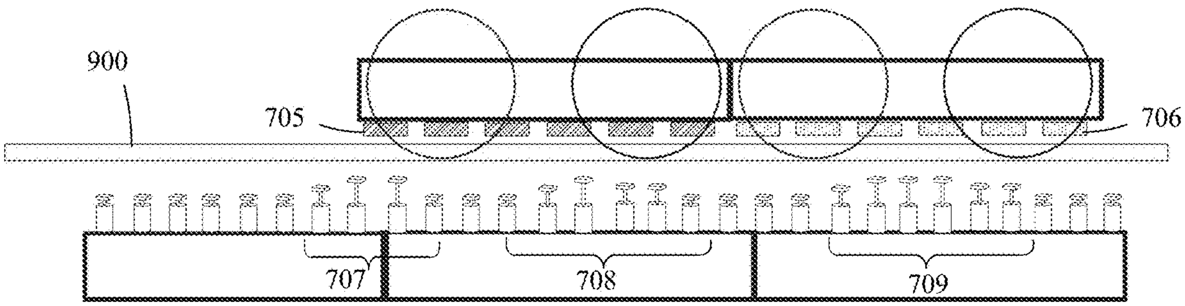
FIG. 23 is a side view of a combined wheeled mover with magnet configuration shown in FIG. 16, with repulsive magnets on the left side and attractive magnets on the right, on rails as shown in FIG. 20, and three modular platforms below the rails. The unit cells are actuated in a way to propel the mover to the right using three separate methods at the same time.

FIG. 23 is a schematic drawing showing a combined mover like that shown in FIG. 16 being pushed to the right using one method and pulled to the right using two separate methods. All of the unit cell permanent magnets are in a normally-repulsive orientation with the mover magnets 705 on the left side of the mover, and in a normally-attractive orientation with respect to the mover magnets 706 on the right side of the mover. The unit cells labeled 707 are providing repulsive force to the mover, pushing it to the right. The unit cells labeled 708 are forming an attractive potential well for the left side mover magnets in normally-repulsive orientation, and the unit cells labeled 709 are forming an attractive potential well for the right side mover magnets in normally-attractive orientation. By lowering and raising unit cells so that the patterns shown in 707, 708 and 709 are recreated incrementally to the right, the unit cells will push and drag the mover to the right using all three mechanisms.

In preferred embodiments, wheels or casters or ball bearings are constructed of non-magnetic, nonferrous materials. Alternatively, the false floor can be made slippery or low friction, such as with water, or ice, or soap, or grease, so that a mover can glide across the floor without needing wheels. In this disclosure, when a wheeled mover or a mover on wheels is mentioned, any of these configurations, or other methods of reducing friction between a mover and the floor, can be substituted.

Figure 17:
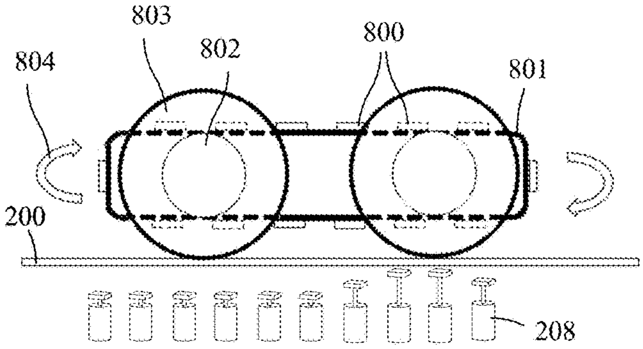
FIG. 17 is a side view of a mover with magnets mounted on a belt, which moves the wheels.
Figure 18:
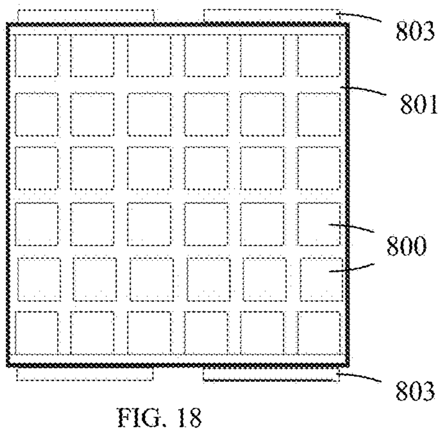
FIG. 18 is a bottom view of the mover shown in FIG. 17.

In another embodiment shown in FIGS. 17 and 18, permanent magnets 800 are attached to a belt 801, which makes intimate contact with one or more axles 802 through a mechanism such as gears (not shown). The axles 802 are attached to wheels 803 which engage with the floor 200 by means of friction. The actuated magnet system, using either attractive or repulsive forces, pulls or pushes the magnets on the part of the belt near the floor in a first direction 804, causing the belt 801 to turn, thereby driving the axle 802 and wheels 803. Various gear arrangements can be used to direct the rotation of the wheels in relation to the rotation of the belt (gears not shown). The belt may turn counter to the direction shown in FIG. 17, and through a 2 gear driver-follower configuration as one example, cause the wheels to turn in the opposite direction to the belt's direction of travel.

In an alternative embodiment, magnets can be directly attached or embedded within the wheels, and forces from actuating permanent magnets cause the wheels to directly turn. A non-rotating structure, such as the frame or body of a car is connected to the axles as through bearings, or to a non-rotating frame that supports and is in contact with the rotating belts again through a bearing interface. The non rotating frame or body allows loads to be transported.

Figure 19:
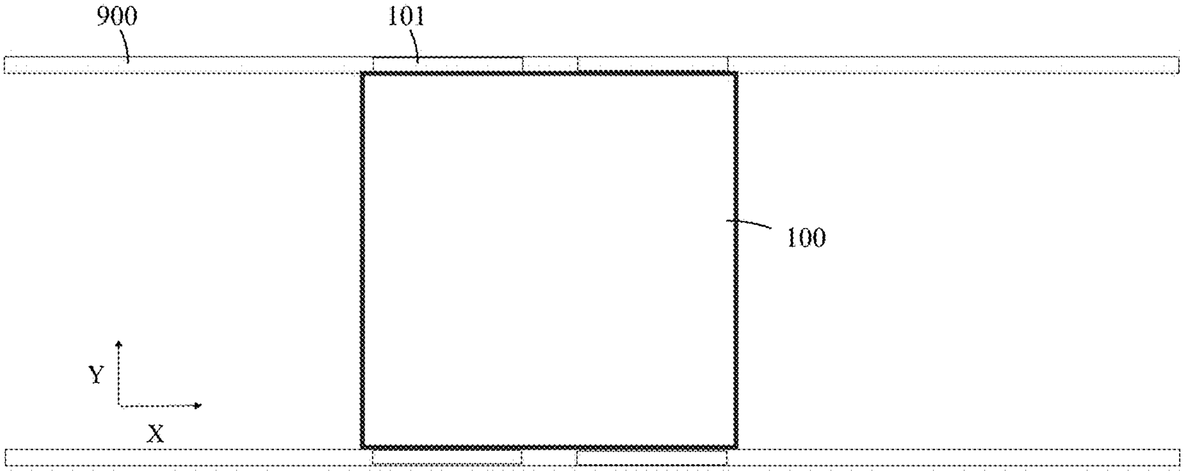
FIG. 19 is a top view of a mover with permanent magnets affixed to its bottom, mounted on rails.
Figure 20:
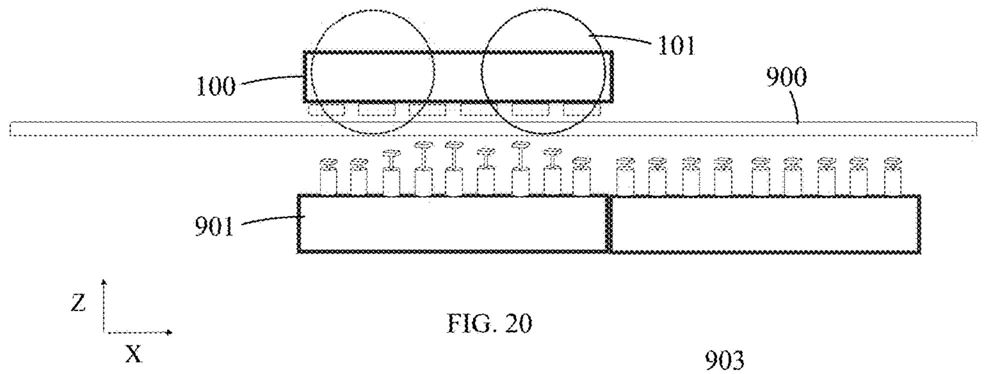
FIG. 20 is a side view of the mover shown in FIG. 19, with modular platforms with unit cells shown underneath.

In a railed embodiment shown in FIGS. 19 and 20, the movers 100 have support structures 101 that rest and travel on a railing system (rails or tracks) 900 instead of a full false floor, see FIG. 19, and the repulsive or attractive forces of the actuated permanent magnets 202 mounted on modular platforms 901 positioned beneath the wheeled movers 100 along the path of the rails 900, see FIG. 20, can be used to push (repulsive forces) or pull (attractive forces) the wheeled mover along the track/rails 900. Appropriate platforms 901 can individually be the same size, longer, shorter, wider or narrower than each wheeled mover 100.

Figure 21:
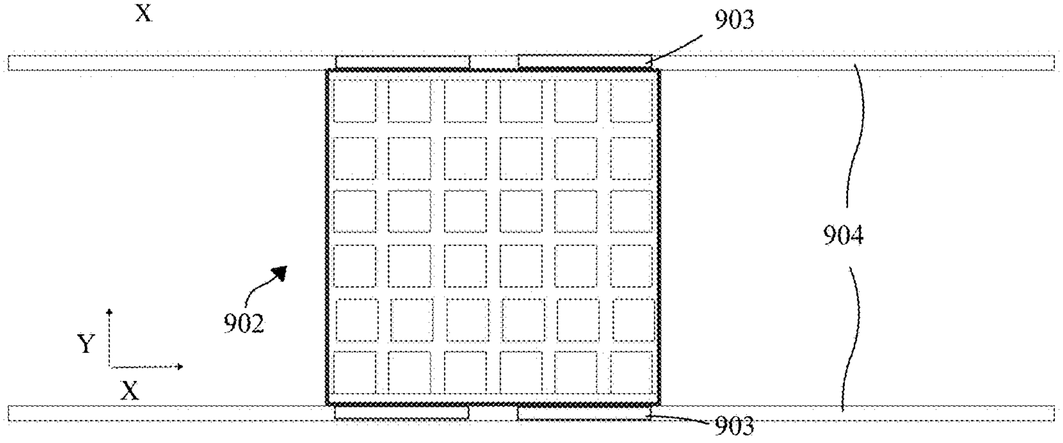
FIG. 21 is a top view of a platform with wheels, mounted on rails.
Figure 22:
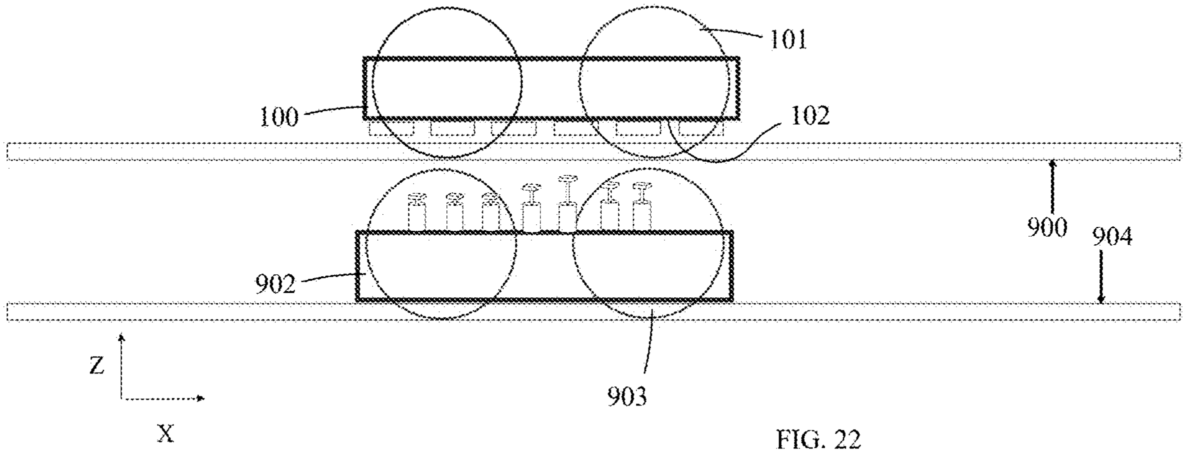
FIG. 22 is a side view of the mover shown in FIG. 19, with the wheeled platform shown in FIG. 21, and both sets of rails.

In another railed embodiment shown in FIGS. 21 and 22, the platforms 902 situated beneath the wheeled movers 100 have wheels 903 themselves, and can also rest and travel on a railing system 904 that is parallel to, but below, the mover railing system 900. The wheeled platform 902, traveling along its railing system 904, positions itself beneath a wheeled mover 100, and causes itself to become stationary, and performs appropriate actuations to cause repulsive or attractive forces that push or pull the mover 100 along its railed path 900.

Alternatively, a platform 902 places itself underneath a mover 100, actuates its magnets to create a potential attractive well that "grabs" the mover, then powers itself (the platform 902) to travel along its rails 904, dragging the mover 100 along with it, overhead on the mover rails 900.

Described herein are details of methods and systems of using the Attractive Magnetic Mobility System to transport movers. Numerical simulations are used to find the optimal positions of the actuated magnets and/or coil currents as a function of position in the XY plane. These pre-computed actuations and/or currents can be stored in a lookup table. For a given position in the XY plane where an attractive well should be formed, each actuator has a prescribed position and each coil has a prescribed current which can be retrieved from this lookup table. The current actual mover position is determined using data from distributed sensors embedded in the system. See exemplary sensors 405 embedded into the floor 209 as part of a magnetic movement system module 901 in FIG. 25. There are various methods for determining the mover position from the sensor data. For example, a color pattern can be attached to the underside of the mover and upward facing RGB sensors distributed throughout the top surface of the platform area as described in U.S. patent application Ser. No. 18/425,978. A neural network can then be trained to quickly and accurately predict the mover position based on the colors that are detected.

The required actuator locations/currents to create a strong restoring force and restoring torque (an attractive well) at every XY location within the configuration space are pre-computed and stored within a lookup table. The required actuator locations/currents for each location are dependent on the platform magnet dimensions and strength and positions, and target mover's area, its number of magnets, the magnets' dimensions and strength, the magnets' positions and other factors. For a specific mover with a size of 10.5 inches by 10.5 inches and with 25 1 inch square magnets spaced in a checkerboard pattern across the bottom of the mover, FIG. 9 shows the lateral and vertical forces experienced by the mover as it is shifted away from an attractive well. At a mover displacement of between 10 and 15 mm from the position the attractive well is formed, the lateral force curve peaks and flattens and the vertical force curve approaches zero and flattens. Therefore, (1) selecting a target location for a mover of this design that is between 10 and 15 mm away from its current location and (2) creating a potential attractive well at this target location will effectively attract the wheeled mover to the potential well.

This process and strategy to execute movement of a wheeled mover on an actuated magnet platform system can be generalized by (1) generating a table of actuator positions/current values that will create an attractive well at every location within the configuration space's XY plane for a specific mover and actuated magnet platform system; (2) generating a chart such as that shown in FIG. 9 for that specific mover and actuated magnet platform system; (3) identifying the flat region of the peak lateral force curve and the flat region of the near zero vertical force curve; (4) using this generally flat region to determine an intermediate travel distance from a mover's current location to an intermediate location; (5) selecting an intermediate target location for a mover on its path to the ultimate target location that is an intermediate travel distance away from the mover's current location; (6) creating an attractive well at this intermediate target location; and (7) then upon the mover arriving at or nearing its intermediate target location, repeating steps 5 through 7 until the mover has reached its ultimate target location.

The method of using a precomputed table that represents the actuation positions and optionally coil currents used to create an attractive potential well at every point (or a grid of points) across the XY plane of the configuration space is computationally simple, and requires very little real-time processing, as the values must only be retrieved. In one embodiment, the table represents a grid of points at ½ mm increments in the XY plane. The well is also calculated at 1 degree Oz increments for each XY location. However, other methods of determining the actuation positions and coil currents exist.

Another approach to create an attractive well is to train a neural net to output desired values for the formation of an attractive well at a target destination. In this approach, neural nets are trained on a series of mover positions, target destinations across the XY plane of the configuration space, actuator positions and/or coil currents, and the corresponding forces generated by those actuator positions and/or coil currents on the mover (as determined through physical simulations). The neural net's objective function is to maximize the vertical force values at each point, while minimizing horizontal forces at that same point. Then, in real time, the control system chooses a target intermediate destination for the mover along the path towards its ultimate destination, and provides the intermediate destination to the neural net as input. The neural net then outputs the desired actuations and/or coil currents to create an attractive potential well at the intermediate destination.

In yet another approach, building on the prior approach, the neural net is trained in much the same way, except that additional training data includes the current actuator positions. The neural net then includes as part of its objective function minimizing the cumulative distances traveled by the actuators as they transition from their current state to the positions required to create an attractive potential well at each intermediate target destination. Then, when operating in real time, inputs to the neural net include additionally the current actuator positions. The neural net then outputs a set of actuations and/or coil currents to create an attractive potential well at the intermediate destination that minimizes changes in actuator positions. The tradeoffs between the strength of the attractive potential well and the minimized actuator motions will depend on the objective function weights.

Other such real-time methods to determine actuator positions exist, and the above are meant to illustrate the breadth of possible approaches.

Figure 24:
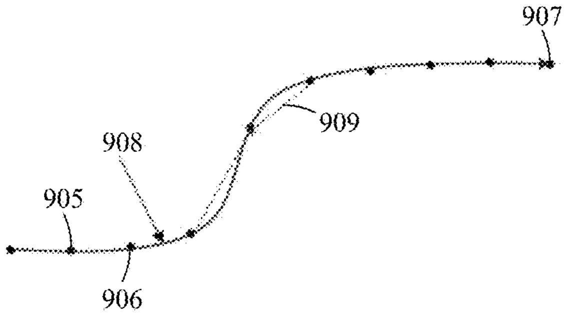
FIG. 24 shows a top view of an example path with interim waypoints marked.

To transport a mover through a prescribed path, one method is to use a series of waypoints. Waypoints are intermediate points that lie on the desired path as shown in FIG. 24. In this method, the control system is initially set with the first waypoint 905 as the target position. The control system applies magnetic forces to move the mover to this target position. These magnetic forces are created either through actuations of permanent magnets or varying the electrical currents in the electromagnetic coils or a combination of both. Once the mover is correctly positioned at the first waypoint 905 or is very near the waypoint, the target position is set to the second waypoint 906. This process continues with the target position for the mover being sequentially stepped through each waypoint until the mover is at the end point 907 of the path. In this method the mover will follow straight line trajectories 909 from one waypoint to the next. The accuracy with which the straight line motion matches the desired path depends on the number of waypoints with a larger number of waypoints more accurately representing the desired path 908. The velocity of the mover is controlled by the forces applied by the control system at each waypoint, and the time interval in which the control switches from one waypoint to the next.

A mover can be a simple, non-powered, non-intelligent platform, i.e. a board with magnets underneath. A mover can have a mechanism to reduce friction between its underside and the floor, such as wheels, casters, or ball bearings. A mover can have power, so that it can change its own position without underlying actuated magnets. A mover can carry anything on top of it, such as a package, a part, a pallet, a vehicle, a robot, or a person. These things carried by the mover can simply rest on the mover's top surface; or be releasably fastened onto the mover; or be permanently fastened to the mover; or be part of the mover.

Figure 27:
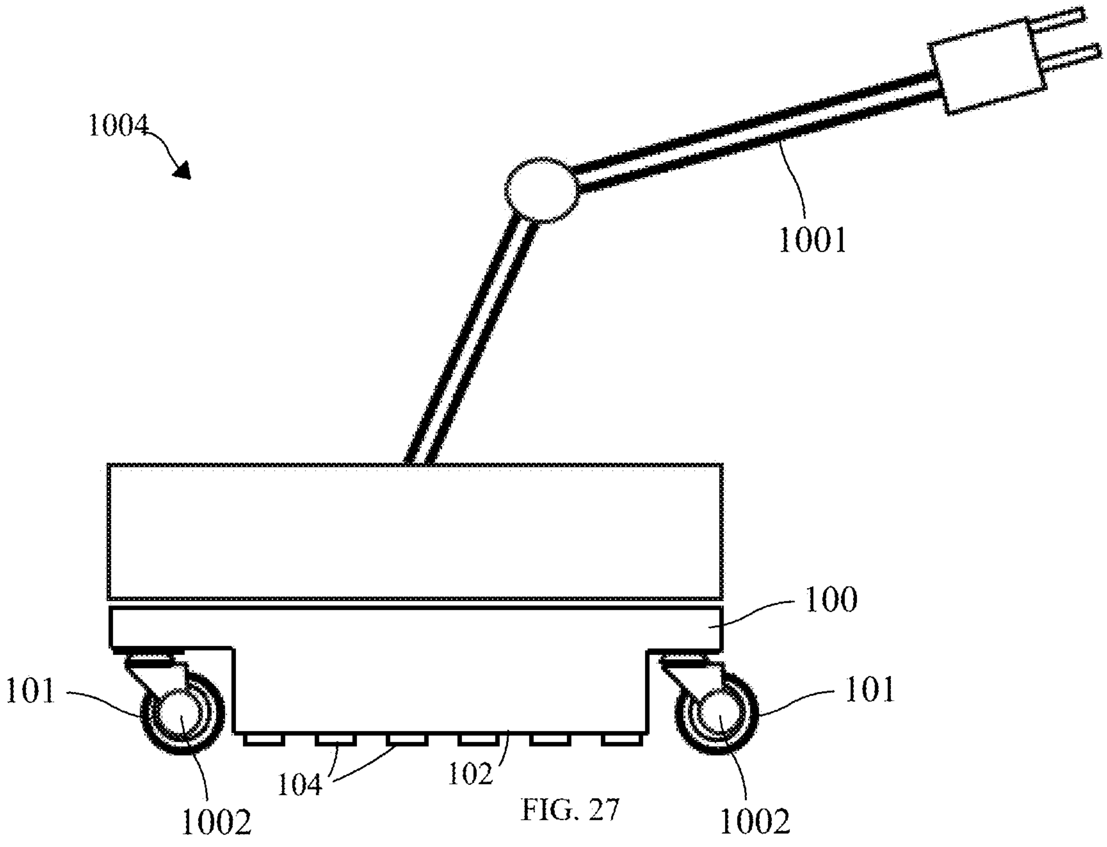
FIG. 27 is a side view of a mobile robot with arm, and with a mover-style array of permanent magnets attached to the robot's underside.

A mover-style arrangement of magnets can be an integral part of a mobile unit, such as a forklift, or an AMR, or an AGV, or a utility vehicle driven by a person, or a self-driving car. Mover-style magnets under a mobile unit can be permanently fixed at a level close to the floor, see FIG. 27, or the magnets can be configured to be raised and lowered at appropriate times. The mover-style magnets can cover the entire underside footprint of a mobile unit; or they can cover any portion of the underside footprint, i.e. a location opposite the side where a robot arm always extends outwards; or the group of magnets can be moved to different locations on the underside footprint, i.e. to a location opposite the side where the robot arm 1001 will extend outwards during this particular operation.

A mover or mobility unit with mover magnets can move under its own power (see motorized wheels 1002), or be moved by floor magnets, or by another method such as a person pushing and steering it.

Figure 28A:
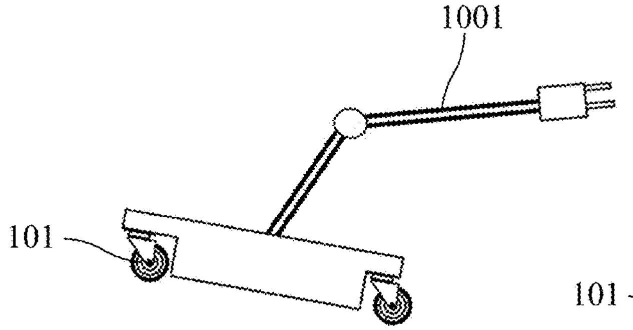
FIG. 28A is a side view of a mobile robot with arm and no counterweight or other mechanism for stability, beginning to tip over as it reaches out.

Any lifting machine which lifts using an arm or fork that is not located at the lifting machine's center of gravity needs a counteracting force to prevent tipping over. See FIG. 28A, showing a robot arm 1001 without a counteracting force.

Figure 28B:
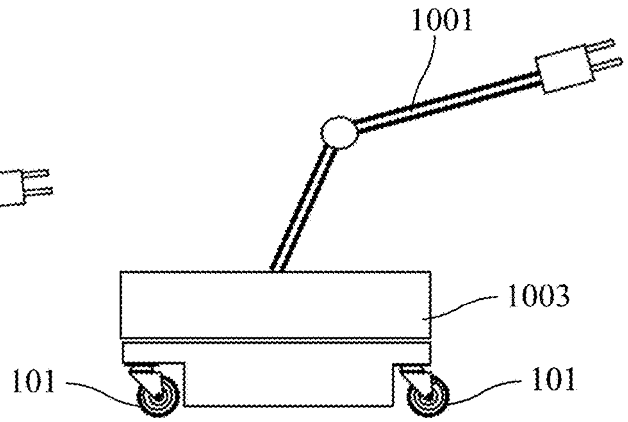
FIG. 28B is a side view of a mobile robot with arm and counterweight, reaching out without tipping over.

Generally, a forklift has a heavy counterweight located between or behind its rear wheels. Generally, a robot arm has a heavy base. These counterweights keep the center of gravity of the combined lifting machine and load in a central location while lifting, so the robot arm or forklift doesn't tip over. See FIG. 28B, showing a robot arm 1001 with a counterweight 1003. The counterweight strategy works well to prevent tipping. However, whenever the lifting machine is moved, the extra mass of the counterweight or heavy base also must be moved.

Figure 29:
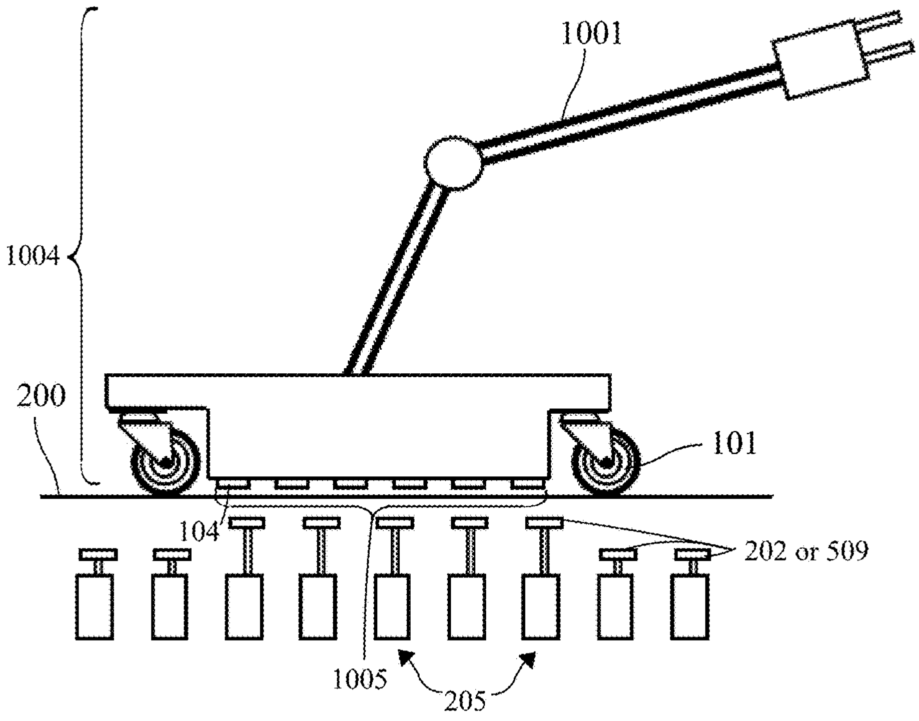
FIG. 29 is a side view of a mobile robot with arm, and with a mover-style array of permanent magnets attached to its underside, and with actuated floor magnets creating attractive forces to stabilize the mobile robot as its arm reaches out.

Using the magnetic mobility system's locking functionality, a counterweight or heavy base is not needed for a forklift or robot arm 1001 (reacher/lifter CSU 1004). Instead, see FIG. 29, a mover-style array 1005 of permanent magnets 104 is installed on the underside of the reacher/lifter 1004, close to the floor. To prepare for a lifting operation, instead of adding counterweights as with a crane, actuated magnets 202 or ferrous material such as iron or low carbon steel 509 in/under the floor 200 underneath the lifter 1004 raise up 205 close enough to create attractive forces pulling the mover magnets 104, 1005 downwards, and locking the reacher/lifter 1004 in place. The attractive magnetic force serves the same purpose as gravitational force of counterweights.

Figure 33:
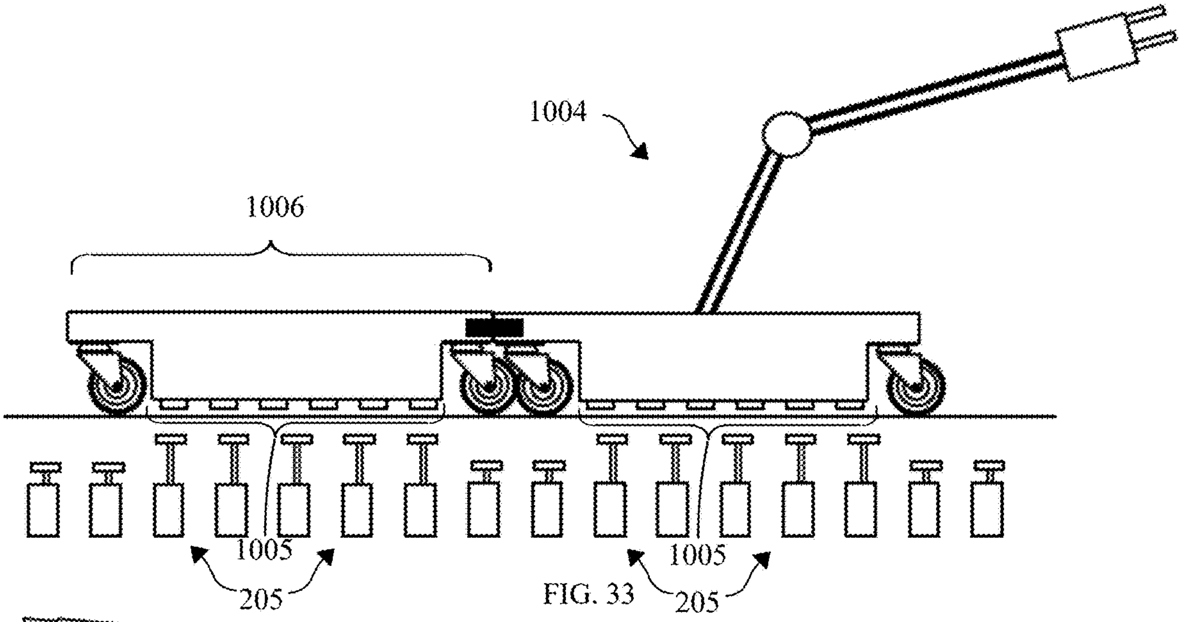
FIG. 33 is a side view of a counterbalance mover connected to a magnetic movement-enabled lifter/reacher mover, with unit cells actuated to lock both movers in place.
Figure 34:
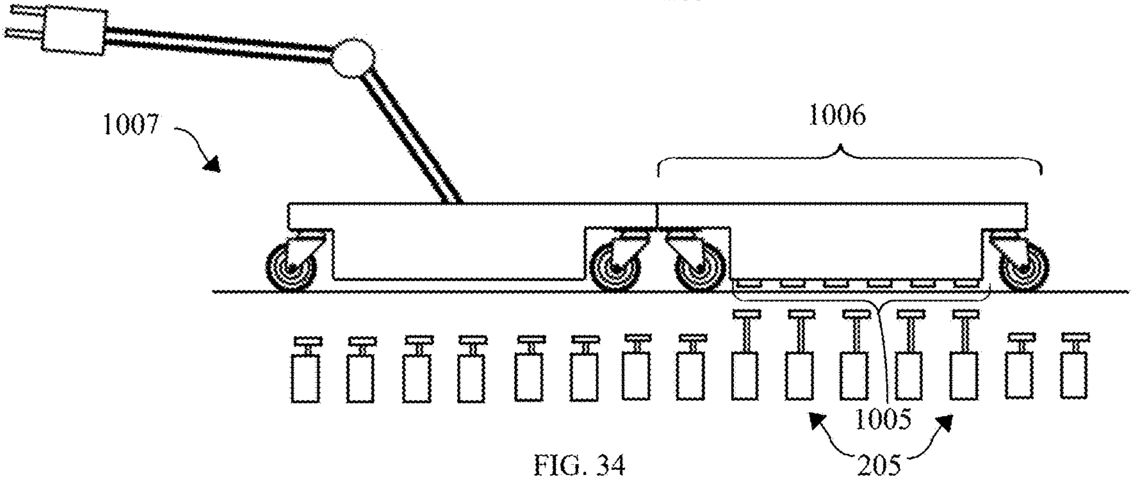
FIG. 34 is a side view of a counterbalance mover connected to a non-magnetic movement enabled lifter/reacher, with unit cells actuated to lock the counterbalance mover in place.

Additional counterweight-style forces can be added by attaching a counterbalance mover 1006 to the reacher/lifter, as in FIGS. 33 and 34. The counterbalance mover is not necessarily massive or heavy, and can be a very simple mover with attachment capability; its counterbalance capability arises from its bottom surface magnets which can be locked using the unit cells. It can be attached to the side of the reacher/lifter opposite the location where a tool or end effector will be reaching outside of the reacher/lifter's footprint, thus lending maximum additional leverage and stability. A counterbalance mover can be attached to any side of the reacher/lifter, depending upon situational needs, floor space, position of obstacles, floor/configuration space layout, and other factors. A counterbalance mover 1006 can attach to and assist a magnetic movement-enabled CSU, as shown in FIG. 33, and a counterbalance mover 1006 can also attach to and assist a non-magnetic movement-enabled CSU, as shown in FIG. 34.

Figure 30A:
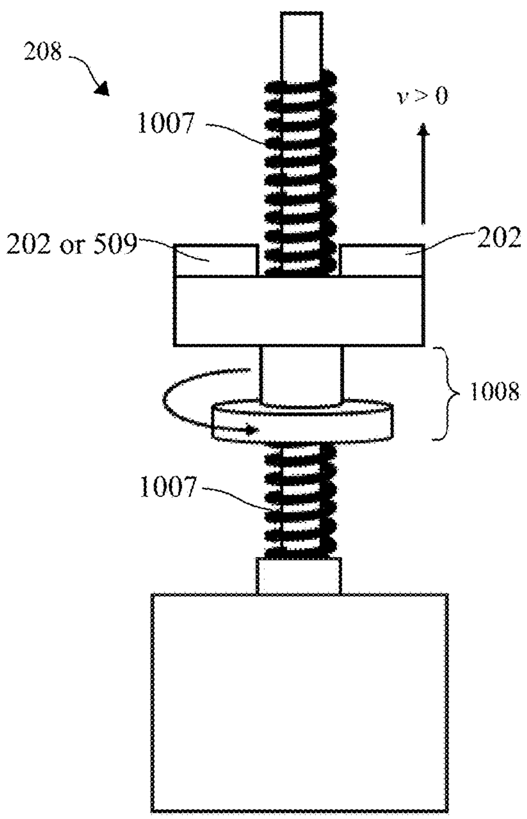
FIG. 30A is a side view of a motorized actuator lifting an attached permanent magnet.
Figure 30B:
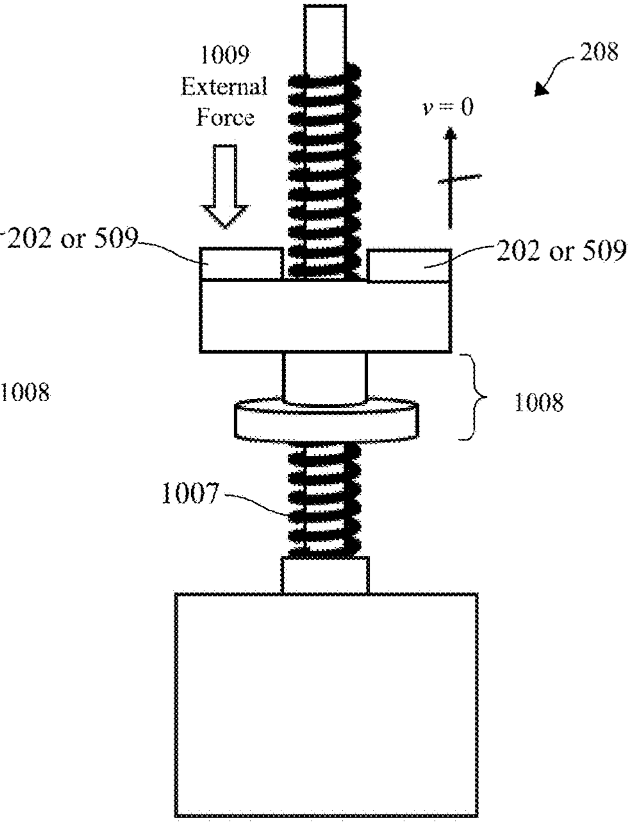
FIG. 30B is a side view of the same motorized actuator and attached permanent magnet shown in FIG. 30A, showing that the non-backdriveable structure resists downward forces.

Electromagnets can serve the same purpose as, or assist, actuated ferrous material/permanent floor magnets. In a preferred embodiment configured to conserve power, electromagnets are used to assist in precise positioning, and then ferrous material/permanent magnets perform the locking work. This example of locking a reacher/lifter in place requires substantial force. Once locked using permanent magnets on both the mover and floor (or permanent magnets on the mover and ferrous material on the floor), the mover stays in place with no further use of power. This is because in the unit cells 208, the actuated ferrous material 509/permanent magnets 202 are mounted on non-backdriveable actuators, such as lead screws 1007 and nuts 1008, as shown in FIGS. 30A and 30B. No external load 1009 can cause the actuator to change its vertical position and break the locking force.

Non-backdriveable or self-locking actuators add important strength, security and stability to the system. A non-backdriveable or self-locking mechanism allows the actuator to change its own position on command, but prevents the actuation position from changing due to external forces. Examples of these mechanisms are worm gears, lead screws, industrial linear actuators which may incorporate self-locking nuts or anti-rotation brakes, and high reduction ratio transmissions.

The locking procedure is also useful for keeping a mobile unit in place, and preventing it from drifting. There are many applications in a warehouse or on a manufacturing floor where a mover will need to stay in place for a period of time. A magnetically locked mover resists movement due to any nudges, pushes, vibrations or tremors.

The same unit cells which lock a CSU in place can also release the mover by moving down and away from the mover magnets. The actuated permanent magnets can raise and lower themselves, and or electromagnets can power up to cause repulsive and/or attractive forces with the mover magnets, causing the mover and any connected mobile unit to change its location and/or orientation. After repositioning, if appropriate, the actuated magnets can lock the mover in place again.

Figure 35:
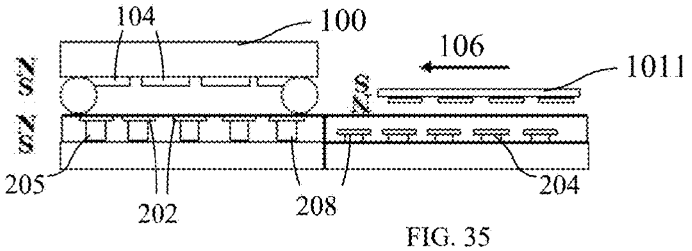
FIG. 35 is a side view of a CSU locked in place, with a counteracting magnet sheet poised to be inserted between the CSU and the unit cells.

A counteracting magnet sheet approach for facilitating the release (unlocking) of a mover from actuated magnets is described herein and shown in FIG. 35. For an attractive system with permanent magnets 104 on the mover 100 and permanent magnets 202 on the unit cells 208, the mover magnets 104 are configured to attract the unit cell magnets, providing the locking forces. Permanent magnets beyond the footprint of the mover may not be actuated 204, resulting in little to no magnetic forces outside the footprint of the mover. This configuration enables a sheet 1011 of magnets (configured as an example in an array similar to that of the mover magnets) with polarity orientation reversed to that of the mover magnets to be slid (in the direction of the arrow 106) between the locked mover magnets 104 and actuated magnets 202, 205 thereby dramatically diminishing the locking forces, and allowing a simple decoupling/release of the mover 100 from the actuated magnets 202.

Figure 36:
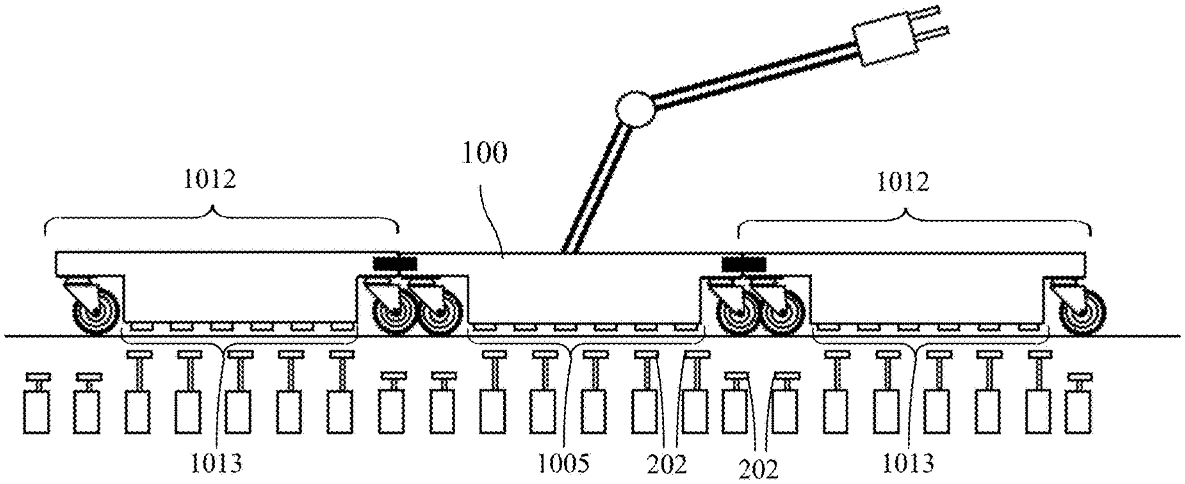
FIG. 36 is a side view of a CSU locked in place, with one release mover attached to each side of the CSU, and unit cells configured to unlock the CSU and release movers.
Figure 37:
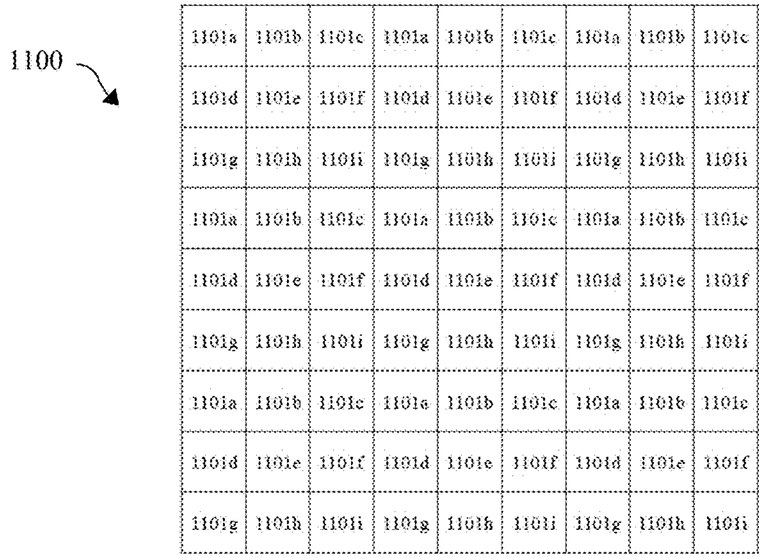
FIG. 37 is a schematic top view of an arrangement of unit cells with actuated elements.

Another release/unlocking approach is to utilize a "release mover" 1012 as shown in FIG. 36. The release mover contains permanent magnets 1013 that are configured to be repulsive in relation to the unit cell actuated magnets 202. The release mover or movers 1012 attach rigidly to the sides of the locked mover 100. Then, by raising the actuated magnets 202 under the release mover, repulsive forces push up on the release mover magnets 1013, pushing up the release movers 1012, which in turn pull the locked mover 100 up, helping to release the locked mover from the underlying actuated magnets 202. In an alternate release mover embodiment, each release mover includes arms or forks that slide under the locked mover, and as the actuated magnets under the release mover are raised, this lifts the release mover and its arms/forks, thus adding force to aid in releasing the locked mover from its underlying actuated magnets.

Figure 31A:
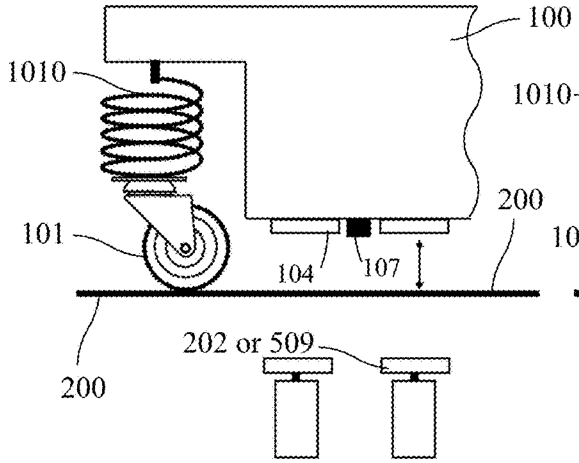
FIG. 31A is a side view of a portion of a configuration space unit with spring-mounted wheels, shown with the spring extended, thus preserving a distance between the CSU's underside magnets and the floor. The under-floor actuated magnets or ferrous material are retracted from the floor.
Figure 31B:
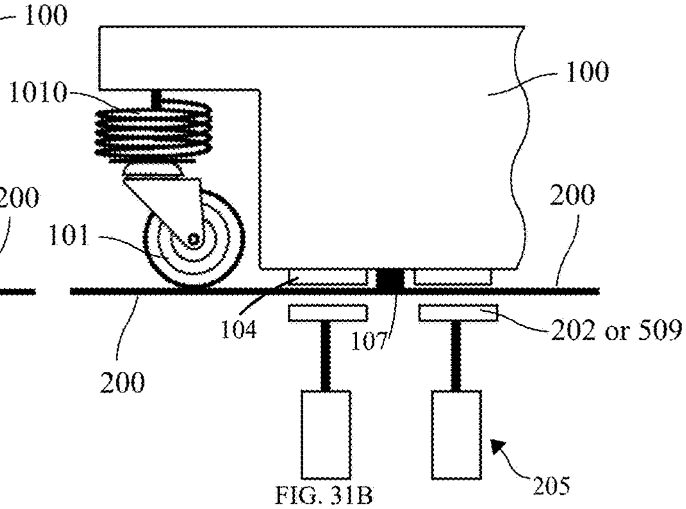
FIG. 31B is the same side view of the same portion of a configuration space unit with spring mounted wheels shown in FIG. 31A, here shown with the spring compressed, so that the CSU's underside magnets approach and touch the floor. The under-floor actuated magnets or ferrous material are extended towards the floor, pulling the CSU magnets downward.

For a castered mover in a well, there is a restoring force that keeps the mover centered in the attractive well. Under lateral forces, however, the mover can be displaced a small distance depending on the magnitude of the lateral force. When the lateral force is removed the castered mover will re-center back to the center of the well. In some applications it is desirable to prevent any motion of the mover from the well center when a lateral force is applied. In this case, additional stability can be achieved with a castered/wheeled mover by adding a springlike mechanism to each of the casters/wheels, as shown in FIGS. 31A and 31B. In this concept, the caster 101 is attached to the mover body using a spring 1010 or other retractable mechanism. When the unit cell actuators under the false floor 200 are extended upwards 205, the actuated magnets or ferrous material create an attractive force with the mover-magnets. As this attractive force is increased, the mover is pulled downwards towards the false floor, compressing the spring. As the attractive force is increased further, the spring continues to be compressed and eventually the bottom surface of the mover rests completely on the false floor, as shown in FIG. 31B. Friction between the mover's bottom surface and the false floor 200 prevents the mover from moving laterally when lateral forces are applied. To prevent the magnets from contacting the floor and being damaged or causing damage or to aid in increasing friction, the magnets may be covered by a bottom surface which makes contact the floor, or bumpers 107 made of rubber or other substance such as those shown in FIGS. 31A and 31B can be installed on the mover underside around and/or between the magnets, having a depth slightly more than the magnets. When the attractive force is reduced or removed, the spring extends, lifting the mover away from the false floor and creating a gap between the bottom of the mover and the false floor. This gap and the lack of an attractive well allows the mover to roll freely.

Figure 32:
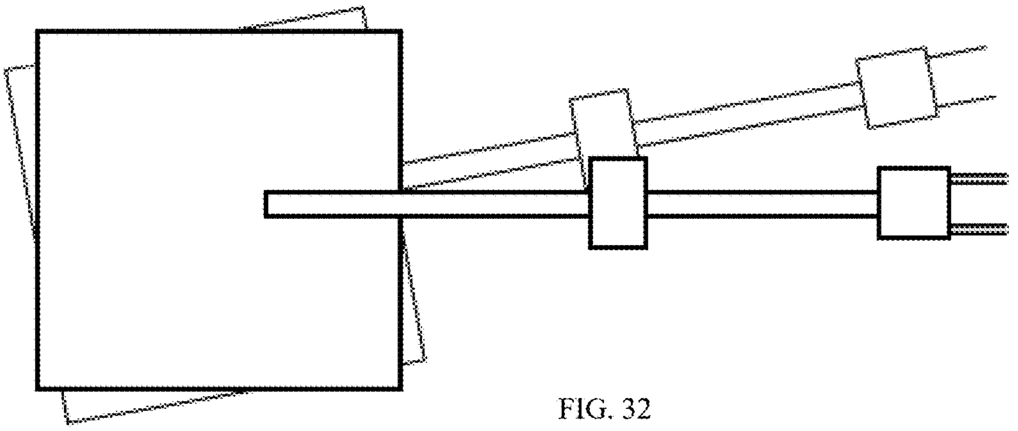
FIG. 32 is a top view of a robot with arm, showing that a small variation in orientation can translate to a significant positional difference at the end of the robot arm.

Even mobile units which can move under their own power can benefit from the precise positioning capability of the magnetic mobility system. Powered casters, for example, cannot position a vehicle to millimeter precision. If orientation of an AMR with 10 foot arm is off by 1 degree, the position of the end effector will be off by over 2 inches-see FIG. 32. A mobile unit with powered casters, for example, can drive itself to a location, and shift to neutral gear, so that the magnetic mobility system can position and orient the mobile unit to sub-millimeter precision, and then also lock the mobile unit in place.

We claim:

1. A system comprising:

a work surface having a configuration space associated therewith;

a configuration space unit having a conveyance system and at least one of a permanent magnet or a mass of ferrous material on a bottom of the configuration space unit, the configuration space unit positionable within the associated configuration space of the work surface; and a magnetic locking system having unit cells arranged in cooperation with the work surface, each unit cell comprising an actuator;

wherein the actuator is coupled to one of a permanent magnet or a mass of ferrous material, such that the actuator causes movement of the permanent magnet or mass of ferrous material towards and away from the work surface;

wherein the magnetic locking system is configured such that a magnetic force produced by an interaction between at least one unit cell and the configuration space unit performs an attractive operation that prevents the configuration space unit from changing position within the configuration space of the work surface.

2. The system of claim 1 wherein each unit cell further comprises one or more of:

a self-locking or non-backdriveable mechanism; or an electromagnet configured to moderate magnetic force produced by interaction between a configuration space unit's permanent magnet and actuated permanent magnet or ferrous material, and to perform an attractive or repulsive operation or pulse that affects a position of the configuration space unit.

3. The system of claim 1 wherein the configuration space unit comprises a plurality of wheels, casters or bearings, each mounted on a spring configured to compress when an attractive force is exerted between a CSU magnet and actuated magnet or ferrous material, thus allowing a CSU bottom surface to make contact with the work surface.

4. The system of claim 1 wherein the CSU has a footprint, and comprises one or more of a mobile manipulator, fork, or robotic arm with tool which is configured to extend beyond the CSU's footprint ("reacher CSU").

5. The system of claim 4, further comprising a counterbalance CSU, configured to be releasably attached to a side of the reacher CSU.

6. The system of claim 1, further comprising a counteracting magnet sheet, having one or more magnets configured to repel locked configuration space unit magnets and actuated magnets, and wherein said counteracting magnet sheet is configured to fit between said configuration space unit and said magnetic locking system.

7. The system of claim 1, further comprising a release mover, having one or more bottom side magnets configured to repel actuated magnets; and wherein said release mover is configured to do one or more of rigidly attaching to a side of a locked mover or inserting one or more arms or forks underneath said locked mover.

8. A method of locking position of a CSU using the system of claim 1, comprising the steps of:

determining a position of a CSU and its magnets on the work surface; and raising one or more actuators, thus bringing magnet or ferrous material closer to said one or more CSU magnets.

9. A method of locking position of a CSU using the system of claim 5, comprising the steps of:

determining a position of a CSU on the work surface; and bringing a counterbalance CSU to a position adjacent to a side of the CSU; and attaching the counterbalance CSU to a side of the CSU; and raising one or more actuators, thus bringing magnet or ferrous material closer to one or more counterbalance CSU magnets.

10. A method of unlocking position of a CSU using the system of claim 1, comprising the steps of:

determining a position of a locked-in-place CSU on the work surface; and lowering one or more actuators located under said CSU's locked-in-pace position, thus pulling magnet or ferrous material farther away from said one or more CSU magnets.

11. A method of unlocking position of a CSU using the system of claim 2, comprising the steps of:

determining a position of a locked-in-place CSU on the work surface; and activating at least one electromagnet located under the locked-in-place CSU position; and lowering one or more actuators located under said CSU's locked-in-place position, thus pulling magnet or ferrous material farther away from said one or more CSU magnets.

12. A method of adjusting and locking position of a CSU using the system of claim 2, comprising the steps of;

determining a current position and orientation of a CSU on the work surface;

comparing said current position and orientation to a target position and orientation;

activating at least one electromagnet to perform an operation which causes said CSU position or orientation closer to said target position and orientation;

repeating said determining, comparing and activating steps until the CSU's current position and orientation match the target position and orientation; and raising one or more actuators, thus bringing magnet or ferrous material closer to said one or more CSU magnets to lock CSU in place.

13. A method of unlocking position of a CSU using the system of claim 6, comprising the steps of:

determining a position of a locked-in-place CSU on the work surface; and sliding said counteracting magnet sheet between said CSU and said work surface; and lowering one or more actuators located under said CSU's locked-in-pace position, thus pulling magnet or ferrous material farther away from said one or more CSU magnets.

14. A method of unlocking position of a CSU using the system of claim 7, comprising the steps of:

determining a position of a locked-in-place CSU on the work surface; and attaching one or more release movers to one or more CSU sides; and raising one or more actuators situated beneath said one or more release movers.

15. A method of unlocking position of a CSU using the system of claim 7, comprising the steps of:

determining a position of a locked-in-place CSU on the work surface; and moving one or more release movers to one or more CSU sides, causing release mover arms or forks to travel underneath said CSU; and raising one or more actuators situated beneath said one or more release movers.

16. A method of magnetic transport using a system comprising:

a work surface having a configuration space associated therewith;

a configuration space unit (CSU) having a conveyance system and one or more permanent magnets on a bottom of the configuration space unit, the configuration space unit positionable within the associated configuration space of the work surface; and a magnetic movement system having unit cells arranged in cooperation with the work surface, each unit cell comprising at least one of an actuator, an electromagnetic coil and a permanent electromagnet;

wherein each actuator is coupled to an element comprising one of a permanent magnet or a mass of ferrous material, such that the actuator causes movement of the element towards or away from the work surface; and wherein the magnetic movement system is configured such that a magnetic force produced by an interaction between at least one unit cell and the configuration space unit performs at least one attractive operation that affects a position of the configuration space unit within the configuration space of the work surface; and wherein the CSU magnets have a diameter, and are configured in a first X-Y pattern and spacing with a first density; and wherein the unit cell elements have even spacing in X and in Y, and wherein each unit cell element has a center, and each element's center is at least a distance of CSU magnet diameter to each other element's center, and wherein the unit cell elements are configured in a second pattern with a second density that is greater by a factor of a whole number than the CSU magnet density; and wherein the first and second patterns are configured such that the center position of each of the CSU magnets matches a center position of a unit cell element;

the method comprising the steps of:

raising a first set of actuators positioned in front of each CSU magnet in the direction of desired travel;

when CSU magnets have moved to a next location wherein the CSU magnets are aligned or nearly aligned with the Z positions of the first set of actuators, then lowering the first set of actuators, and raising a second set of actuators positioned in front of each CSU magnet in the direction of desired travel; and repeating said raising and lowering steps until the CSU has arrived at a target destination.

* * * * *